United States Patent
Zou et al.

(10) Patent No.: US 10,560,712 B2
(45) Date of Patent: Feb. 11, 2020

(54) AFFINE MOTION PREDICTION FOR VIDEO CODING

(71) Applicant: QUALCOMM Incorporated, San Diego, CA (US)

(72) Inventors: Feng Zou, San Diego, CA (US); Jianle Chen, San Diego, CA (US); Marta Karczewicz, San Diego, CA (US); Xiang Li, San Diego, CA (US); Hsiao-Chiang Chuang, San Diego, CA (US); Wei-Jung Chien, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 124 days.

(21) Appl. No.: 15/587,044

(22) Filed: May 4, 2017

(65) Prior Publication Data

US 2017/0332095 A1 Nov. 16, 2017

Related U.S. Application Data

(60) Provisional application No. 62/337,301, filed on May 16, 2016.

(51) Int. Cl.
*H04N 19/513* (2014.01)
*H04N 19/124* (2014.01)
(Continued)

(52) U.S. Cl.
CPC ......... *H04N 19/513* (2014.11); *H04N 19/124* (2014.11); *H04N 19/18* (2014.11);
(Continued)

(58) Field of Classification Search
CPC .... H04N 19/52; H04N 19/537; H04N 19/176; H04N 19/57; H04N 19/182;
(Continued)

(56) References Cited

U.S. PATENT DOCUMENTS

| 6,404,815 B1 * | 6/2002 | Sekiguchi | H04N 19/53 375/240.16 |
| 6,711,211 B1 * | 3/2004 | Lainema | H04N 19/56 375/240.24 |

(Continued)

FOREIGN PATENT DOCUMENTS

| WO | 2011013253 A1 | 2/2011 |
| WO | 2017087751 A1 | 5/2017 |

(Continued)

OTHER PUBLICATIONS

Huawei Technologies: "Affine transform prediction for next generation video coding", ITU-T SGI6 Meeting; Oct. 12, 2015-Oct. 23, 2015; Geneva, No. T13-SQ16-C-1018 (Year: 2015).*

(Continued)

*Primary Examiner* — Dramos Kalapodas
(74) *Attorney, Agent, or Firm* — Shumaker & Sieffert, P.A.

(57) ABSTRACT

An example method includes obtaining, for a current block of video data, values of motion vectors (MVs) of an affine motion model of a neighboring block of video data; deriving, from the values of the MVs of the affine motion model of the neighboring block, values of predictors for MVs of an affine motion model of the current block; decoding, from a video bitstream, a representation of differences between the values of the MVs of the affine motion model for the current block and the values of the predictors; determining the values of the MVs of the affine motion model for the current block from the values of the predictors and the decoded differences; determining, based on the determined values of the MVs of the affine motion model for the current block, a predictor block of video data; and reconstructing the current block based on the predictor block.

37 Claims, 14 Drawing Sheets

(51) Int. Cl.
H04N 19/18 (2014.01)
H04N 19/44 (2014.01)
H04N 19/567 (2014.01)
H04N 19/91 (2014.01)
(52) U.S. Cl.
CPC ........... H04N 19/44 (2014.11); H04N 19/567 (2014.11); H04N 19/91 (2014.11)
(58) Field of Classification Search
CPC .. H04N 19/122; H04N 19/139; H04N 19/513; H04N 7/32; H04N 19/46; H04N 19/527; H04N 19/70; H04N 19/184; H04N 19/96
See application file for complete search history.

(56) References Cited

U.S. PATENT DOCUMENTS

| | | | |
|---|---|---|---|
| 6,738,423 B1 * | 5/2004 | Lainema | H04N 19/105 375/240.03 |
| 9,282,338 B2 | 3/2016 | Zheng et al. | |
| 9,736,498 B2 | 8/2017 | Lin et al. | |
| 2002/0034250 A1 * | 3/2002 | Yoo | H04N 19/537 375/240.16 |
| 2006/0067585 A1 * | 3/2006 | Pace | G06K 9/3241 382/243 |
| 2012/0177120 A1 | 7/2012 | Guo et al. | |
| 2013/0128974 A1 | 5/2013 | Chien et al. | |
| 2013/0287116 A1 | 10/2013 | Helle et al. | |
| 2017/0054996 A1 | 2/2017 | Xu et al. | |
| 2017/0085917 A1 | 3/2017 | Hannuksela et al. | |
| 2017/0214932 A1 * | 7/2017 | Huang | H04N 19/527 |
| 2017/0339425 A1 | 11/2017 | Jeong et al. | |
| 2018/0309990 A1 * | 10/2018 | Alshina | H04N 19/70 |
| 2018/0352247 A1 | 12/2018 | Park et al. | |

FOREIGN PATENT DOCUMENTS

| | | | | |
|---|---|---|---|---|
| WO | WO-2017087751 A1 * | 5/2017 | | H04N 19/70 |
| WO | 2017200771 A1 | 11/2017 | | |

OTHER PUBLICATIONS

Chen J et al; "Algorithm description of Joint Exploration Test Model 2", 2. JVET Meeting; Feb. 20, 2016-Feb. 26, 2016; San Diego; {The Joint Video Exploration Team of ISO/iEC JTC1/SC29/WG11 and ITU-T SG.18 } (Year: 2016).*
Huawei Technologies: "Affine transform prediction for next generation video coding", ITU-T SGI6 Meeting; Oct. 12, 2015-Oct. 23, 2015; Geneva, No. T13-SQ16-C-1018, Sep. 29, 2015 (Sep. 29, 2015), XPO30100743 (Year: 2015).*
Huawei Technologies: (hereinafter Huawei); "Affine transform prediction for next generation video coding", ITU-T SGI6 Meeting; Oct. 12, 2015-Oct. 23, 2015; Geneva, No. T13-SQ16-C-1018, Sep. 29, 2015 (Sep. 29, 2015); XPO30100743 (Year: 2015).*
Huawei Technologies: (hereinafter Huawei); "Affine transform prediction for next generation video coding", ITU-T SGI6 Meeting; Oct. 12, 2015-Oct. 23, 2015; Geneva, No. T13-SQ16-C-1018, Sep. 29, 2015 (Sep. 29, 2015); XPO30100743 (Year: 2015) (Year: 2015).*
Chen et al., "Algorithm description of Joint Exploration Test Model 2", JVET Meeting; Feb. 20-26, 2016; 2nd Meeting: San Diego; The Joint Video Exploration Team of ISO/IEC JTC1/SC29/WG11 and ITU-T SG.16; No. JVET-B1001-v1, Mar. 8, 2016, XP030150091, 31 pp.
He et al., "Efficient coding with adaptive motion models", Picture Coding Symposium; Apr. 23-25, 2003; Saint Malo, Apr. 23, 2003, XP030080026, 5 pp.
Huawei Technologies Co., Ltd., "Affine Transform Prediction for Next Generation Video Coding," ITU-T SG16 Meeting; Oct. 12-23, 2015; Geneva, No. T13-SG16-C-1016, Sep. 29, 2015, XP030100743, 11 pp.

International Search Report and Written Opinion of International Application No. PCT/US2017/031258, dated Jul. 24, 2017, 15 pp.
Li et al., "An Efficient Four-Parameter Affine Motion Model for Video Coding," Cornell University Library, 201 Olin Library Cornell University Ithaca, NY 14853, Feb. 21, 2017, XP080747890, 14 pp.
Zou et al., "Improved Affine Motion Prediction," JVET Meeting; May 26-Jun. 1, 2016; Geneva; The Joint Video Exploration Team of ISO/IEC JTC1/SC29/WG11 and ITU-T SG.16, No. JVET-C0062, May 17, 2016, XP030150163, 5 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.263, Series H: Audiovisual and Multimedia Systems, Infrastructure of audiovisual services—Coding of moving video, Video coding for low bit rate communication, The International Telecommunication Union, Jan. 2005, 226 pp.
ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 220 pp.
ITU-T H.261, Line Transmission of Non-Telephone Signals, Video Codec for Audiovisual Services At p × 64 kbits, The International Telecommunication Union, Mar. 1993, 29 pp.
Chen et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21 2015, JVET-A1001, 27 pp.
Chen et al., Algorithm Description of Joint Exploration Test Model 2 Joint Video Exploration Team (JVET) of ITU-T SG 16 WP 3 and ISO/IEC JTC 1/SC 29/WG 11, 2nd Meeting: San Diego, Feb. 20-26, 2016, JVET-B1001-v3, 32 pp.
Zou et al., "Improved Affine Motion Prediction," JVET Meeting; May 26-Jun. 1, 2016; Geneva; The Joint Video Exploration Team of ISO/IEC JTC1/SC29/WG11 and ITU-T SG.16, No. JVET-C0062-v2, Apr. 4, 2017, 5 pp.
Chen et al., Algorithm Description of Joint Exploration Test Model 3 Joint Video Exploration Team (JVET) of ITU-T SG 16 WP 3 and ISO/IEC JTC 1/SC 29/WG 11, 3rd Meeting: Geneva, May 26-Jun. 1, 2016, JVET-C1001-v3, 37 pp.
Chen et al., Algorithm Description of Joint Exploration Test Model 4 Joint Video Exploration Team (JVET) of ITU-T SG 16 WP 3 and ISO/IEC JTC 1/SC 29/WG 11, 4th Meeting: Chengdu, Oct. 15-21, 2016, JVET-D1001-v3, 39 pp.
Chen et al., Algorithm Description of Joint Exploration Test Model 5 (JEM 5) Joint Video Exploration Team (JVET) of ITU-T SG 16 WP 3 and ISO/IEC JTC 1/SC 29/WG 11, 5th Meeting: Geneva, Jan. 12-20, 2017, JVET E1001-v2, 44 pp.
Wang et al., "High Efficiency Video Coding (HEVC) Defect Report 2", Joint Collaborative Team on Video Coding (JCT-VC) of ITU-T SG 16 WP 3 and ISO/IEC JTC 1/SC 29/WG 11, 15th Meeting: Geneva, Oct. 23-Nov. 1, 2013, JCTV-O1002-v2, 311 pp.
Flynn et al., "High Efficiency Video Coding (HEVC) Range Extensions text specification: Draft 6", Joint Collaborative Team on Video Coding (JCT-VC) of ITU-T SG 16 WP 3 and ISO/IEC JTC 1/SC 29/WG 11, 16th Meeting: San Jose, Jan. 9-17, 2014, JCTVC-P1005_v1, 368 pp.
ITU-T H.223, Series H: Audiovisual and Multimedia Systems, Infrastructure of audiovisual services—Transmission multiplexing and sychronization, Multiplexing protocol for low bit rate multimedia communication, International Telecommunication Union, Jul. 2001, 74 pp.
Reply to Written Opinion from corresponding PCT Application Serial No. PCT/US2017/031258 filed on Dec. 7, 2017 (26 pages).
Second Written Opinion from corresponding PCT Application Serial No. PCT/US2017/031258 dated Apr. 17, 2018 (6 pages).
International Search Report and Written Opinion—PCT/US2018/055209—ISA/EPO—dated Jan. 2, 2019 (16 pp).

(56) References Cited

OTHER PUBLICATIONS

U.S. Appl. No. 16/155,744, filed Oct. 9, 2018.
Zou F., et al.,"EE4: Improved affine motion prediction", 4th JVET Meeting; Oct. 15, 2016-Oct. 21, 2016; Chengdu; (The Joint Video Exploration Team of ISO/IEC JTC1/SC29/WG11 and ITU-T SG. 16); URL: http://phenix.int-evry.fr/jvet/,, No. JVET-D0121, Oct. 6, 2016, XP030150372, 4 pages.
Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages.
Chapter II Demand and Response to Written Opinion from International Application No. PCT/US2017/055350, dated Jul. 16, 2018, 38 pp.
Chen., et al., "Algorithm description of Joint Exploration Test Model 2," Joint Video Exploration Team (JVET) of ITU-T SG 16 WP 3 and ISO/IEC JTC 1/SC 29/WG 11, 2nd Meeting: San Diego, USA, Feb. 20-26, 2016, JVET-B1001, Mar. 25, 2016, 32 pages.
Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL:http://phenix. int-evry.fr/jvet/, pp. 1-43.
International Preliminary Report on Patentability—PCT/US2017/ 055350, The International Bureau of WIPO—Geneva, Switzerland, Oct. 26, 2018 29 pp.
International Search Report and Written Opinion—PCT/US2017/ 055350—ISA/EPO—Feb. 13, 2018 15 pp.
Segall A., et al., "Joint Call for Proposals on Video Compression with Capability Beyond HEVC," Joint Video Exploration Team (JVET) of ITU-T SG 16 WP 3 and ISO/IEC JTC 1/SC 29/WG 11, 8th Meeting: Macao, CN, Oct. 18-24, 2017, No. JVET-H1002, Oct. 23, 2017, 27 pp.
Sullivan G.J., et al., "Overview of the High Efficiency Video Coding (HEVC) Standard", IEEE Transactions on Circuits and Systems for Video Technology, vol. 22, No. 12, Dec. 1, 2012 (Dec. 1, 2012), XP55388661, USA ISSN: 1051-8215, DOI: 10.1109/TCSVT.2012. 2221191, pp. 1649-1668.
U.S. Appl. No. 62/570,417, filed by Kai Zhang, et al., filed Oct. 10, 2017.
Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.
Wang Y., et al., "High Efficiency Video Coding (HEVC) Defect Report 2," JCT-VC Meeting; Oct. 23-Nov. 1, 2013; San Jose; (Joint Collaborative Team on Video Coding of ISO/IEC JTC1/SC29/ WG11 and ITU-T SG.16); No. JCTVC-O1003_v2; Nov. 24, 2013; 311 pp.

\* cited by examiner

Sub-PUs in ATMVP mode

Sub-blocks at CU/PU boundary

AFFINE MOTION PREDICTION FOR VIDEO CODING

This application claims the benefit of U.S. Provisional Application No. 62/337,301, filed May 16, 2016, the entire content of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in video coding standards. The video devices may transmit, receive, encode, decode, and/or store digital video information more efficiently by implementing such video coding techniques.

Some video coding standards are defined by MPEG-2, MPEG-4, ITU-T H.263, ITU-T H.264/MPEG-4, Part 10, Advanced Video Coding (AVC) including its Scalable Video Coding (SVC) and Multiview Video Coding (MVC) extensions, ITU-T H.265, also referred to as High Efficiency Video Coding (HEVC), and extensions of such standards. Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available at itu.int/rec/T-REC-H.265-201504-S/en. Range Extensions to HEVC, namely HEVC-Rext, are also being developed by the JCT-VC. A recent Working Draft (WD) of Range extensions, referred to as RExt WD6 hereinafter, is available from phenix.intevry.fr/jct/doc_end_user/documents/16_San%20Jose/wg11/JCTVC-P1005-v1.zip.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which for some techniques may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In one example, a method for decoding video data includes: obtaining, by one or more processors of a video decoder and for a current block of video data, values of motion vectors of an affine motion model of a neighboring block of video data; deriving, by the one or more processors and from the values of the motion vectors of the affine motion model of the neighboring block of video data, values of predictors for motion vectors of an affine motion model of the current block of video data; decoding, by the one or more processors and from an encoded video bitstream, a representation of differences between the values of the motion vectors of the affine motion model for the current block of video data and the values of the predictors; determining, by the one or more processors, the values of the motion vectors of the affine motion model for the current block of video data from the values of the predictors and the decoded differences; determining, based on the determined values of the motion vectors of the affine motion model for the current block of video data, a predictor block of video data; and reconstructing the current block of video data based on the predictor block of video data.

In another example, a method for encoding video data includes: determining, by one or more processors of a video encoder, values of motion vectors of an affine motion model of a current block of video data, the motion vectors of the affine motion model identifying a predictor block of video data for of the current block of video data; obtaining, by the one or more processors, values of motion vectors of an affine motion model of a neighboring block of video data; deriving, by the one or more processors and from the values of the motion vectors of the affine motion model of the neighboring block of video data, values of predictors for motion vectors of an affine motion model of the current block of video data; and encoding, by the one or more processors and in an encoded video bitstream, a representation of differences between the values of the motion vectors of the affine motion model for the current block of video data and the values of the predictors.

In another example, a device for decoding a block of video data includes: a memory configured to store the video data; and one or more processing units implemented in circuitry. In this example, the one or more processing units are configured to: obtain, for a current block of video data, values of motion vectors of an affine motion model of a neighboring block of video data; derive, from the values of the motion vectors of the affine motion model of the neighboring block of video data, values of predictors for motion vectors of an affine motion model of the current block of video data; decode, from an encoded video bitstream, a representation of differences between the values of the motion vectors of the affine motion model for the current block of video data and the values of the predictors; determine the values of the motion vectors of the affine motion model for the current block of video data from the values of the predictors and the decoded differences; determine based on the determined values of the motion vectors of the affine motion model for the current block of video data, a predictor block of video data; and reconstruct the current block of video data based on the predictor block of video data.

In another example, a device for encoding a block of video data includes: a memory configured to store the video data; and one or more processing units implemented in circuitry. In this example, the one or more processing units are configured to: determine values of motion vectors of an affine motion model of a current block of video data, the motion vectors of the affine motion model identifying a predictor block of video data for of the current block of video data; obtain values of motion vectors of an affine motion model of a neighboring block of video data; derive, from the values of the motion vectors of the affine motion model of the neighboring block of video data, values of predictors for motion vectors of an affine motion model of the current block of video data; and encode, in an encoded video bitstream, a representation of differences between the values of the motion vectors of the affine motion model for the current block of video data and the values of the predictors.

In another example, a device for encoding or decoding video data includes: means for obtaining, for a current block of video data, values of motion vectors of an affine motion model of a neighboring block of video data; means for deriving, from the values of the motion vectors of the affine motion model of the neighboring block of video data, values of predictors for motion vectors of an affine motion model of the current block of video data; means for obtaining differences between the values of the motion vectors of the affine motion model for the current block of video data and the values of the predictors; means for determining each of the values of the motion vectors of the affine motion model for the current block of video data from the values of the predictors and the decoded differences; and means for identifying, based on the determined values of the motion vectors of the affine motion model for the current block of video data, a predictor block of video data.

In another example, a computer-readable storage medium storing instructions that, when executed, cause one or more processors of a video encoder or a video decoder to: obtain, for a current block of video data, values of motion vectors of an affine motion model of a neighboring block of video data; derive, from the values of the motion vectors of the affine motion model of the neighboring block of video data, values of predictors for motion vectors of an affine motion model of the current block of video data; obtain differences between the values of the motion vectors of the affine motion model for the current block of video data and the values of the predictors; determine each of the values of the motion vectors of the affine motion model for the current block of video data from the values of the predictors and the decoded differences; and identify, based on the determined values of the motion vectors of the affine motion model for the current block of video data, a predictor block of video data.

The details of one or more examples are set forth in the accompanying drawings and the description below. Other features, objects, and advantages will be apparent from the description and drawings, and from the claims.

DETAILED DESCRIPTION

Figure 1:
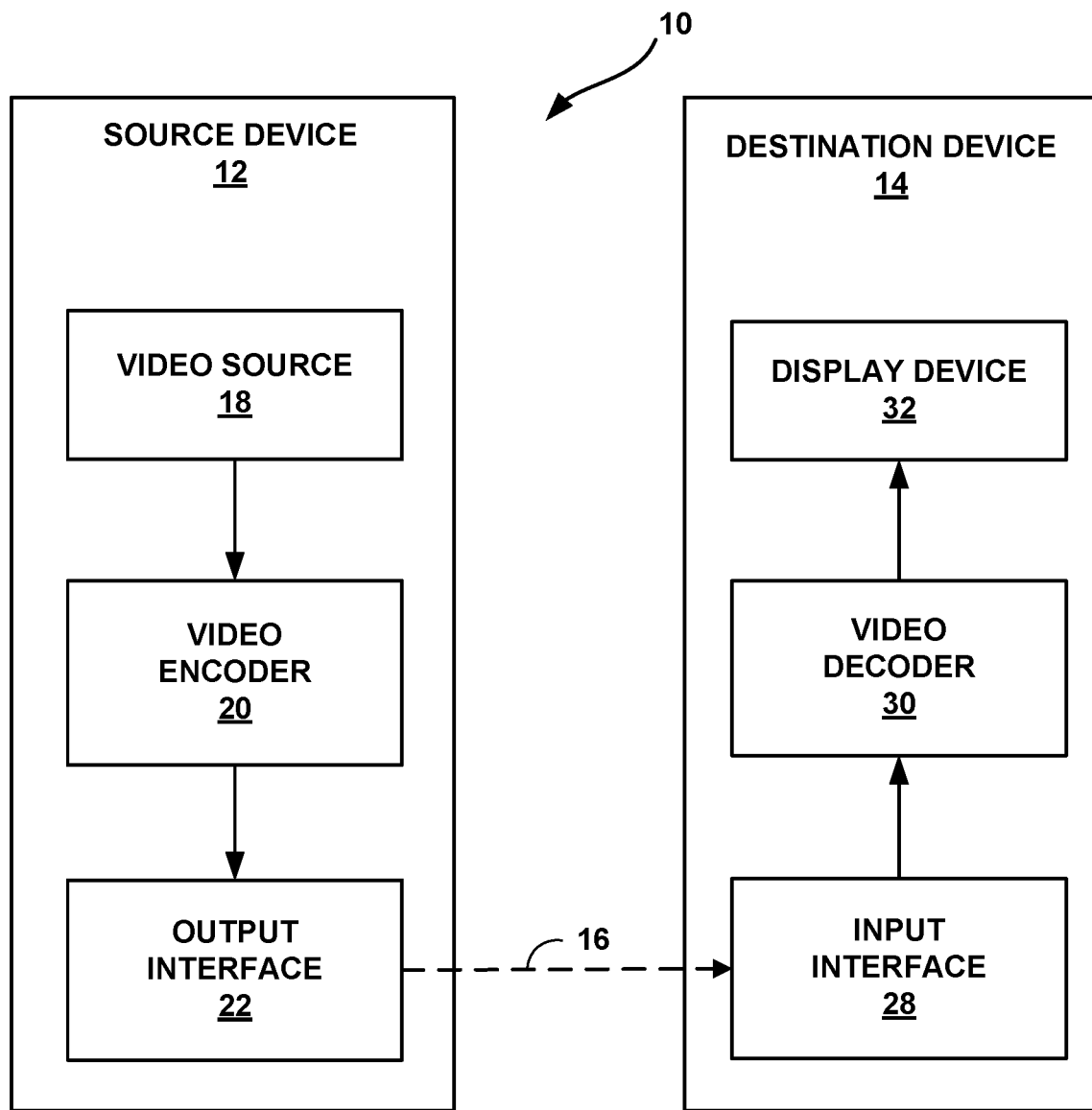
FIG. 1 is a block diagram illustrating an example video encoding and decoding system that may be configured to perform the techniques of this disclosure.

In general, this disclosure describes techniques related to coding (e.g., encoding or decoding) of affine motion information for a block of video data. In current video coding standards, only translational motion models are applied for motion compensation prediction (MCP). When using a translational motion model for MCP, video coders (e.g., video encoders or video decoders) may utilize a single two-dimensional motion vector (MV) for a current block that indicate a displacement between the current block of video data and a corresponding predictor block of video data. The MVs may be two-dimensional in that each MV may have an x-component indicating a horizontal displacement between the current block of video data and the predictor block of video data, and a y-component indicating a vertical displacement between the current block of video data and the predictor block of video data. As discussed in further detail below, in current video coding standards such as HEVC, there are two inter prediction modes, named merge (skip is considered as a special case of merge) and advanced motion vector prediction (AMVP) modes. In merge mode, the value of an MV of a current block is directly inherited from the value of an MV candidate, which may be the value of an MV of a neighboring block of the current block. By contrast, in AMVP mode, the value of the MV candidate may be further refined. In particular, a video coder may signal a value of a difference between the value of the MV candidate and the value of the MV for the current block. The value of the difference may be referred to as a motion vector difference (MVD).

However, there are many kinds of motions other than translational motions, such as zoom in motion, zoom out motions, rotation motions, perspective motions, and other irregular motions. Applying only the translational motion model for MCP in such test sequences with irregular motions may affect the prediction accuracy and may result in low coding efficiency. For instance, using only the translational motion model may result in prediction blocks that are not as well matched to original blocks being coded. As a result, the size of the residual data (i.e., values representing pixel differences between original blocks to be coded and the prediction block) may be increased, which may reduce coding efficiency.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. JVET has released a Joint Exploration Model (JEM) that describes the coding features that are under coordinated test model study as potential enhanced video coding technology beyond the capabilities of HEVC. In JEM, affine motion models are proposed for application to MCP. A recent algorithm description of JEM, "Algorithm Description of Joint Exploration Test Model 2," Joint Video Exploration Team (JVET) of ITU-T SG 16 WP 3 and ISO/IEC JTC 1/SC 29/WG 11, 2nd Meeting: San Diego, USA, 20-26 Feb. 2016, Document: JVET-B1001_v3 (hereinafter "JEM test model") is available from phenix.itsudparis.eu/jvet/doc_end_user/documents/2_San%20Diego/wg11/JVET-B1001-v3.zip.

When using affine motion models for MCP, video coder may utilize multiple motion vectors for a current block that collectively indicate an affine transformation (e.g., translation, scaling, reflection, rotation, etc.) between the current block of video data and a corresponding predictor block of video data. For instance, an affine motion model may include a first two-dimensional motion vector indicating a displacement between a top-left corner of a current block and a top-left corner of the corresponding predictor block, and a second two-dimensional motion vector indicating a displacement between a top-right corner of the current block and a top-right corner of the corresponding predictor block. The motion vectors in an affine motion model may be referred to as control point motion vectors (CPMVs) and may be referenced to a location (i.e., a control point) on the current block. For instance, a two-dimensional motion vector that indicates a displacement between a top-left corner of a current block and a top-left corner of the corresponding predictor block may be referred to as the top-left CPMV of the current block. As discussed in further detail below, in the JEM test model, there are two inter prediction modes, affine inter (e.g., AF_INTER) and affine merge (e.g., AF_MERGE).

In affine merge mode, the value for each CPMV of a current block is directly derived from the CPMVs of a single neighboring block of the current block that is coded using an affine motion model. In other words, in affine merge mode, the CPMVs of the neighboring block are merely warped to the CPMVs of the current block, and there is no flexibility to change or adjust the affine model parameters. In particular, it is not possible to modify the values of the CPMVs using MVDs.

In affine inter mode, the value for each CPMV of a current block is derived individually, based on the value of a MV of a block that neighbors the corresponding control point and a MVD. The value of the MV that a CPMV is determined based on may be referred to as a control point motion vector predictor (CPMVP). As one example, the value of the top-left CPMV of a current block may be derived based on a MV of one of a left block, an above-left block, or an above neighboring block adjacent to the top-left point of the current block and a MVD. As another example, the value of the top-right CPMV of a current block may be derived based on a MV of one of an above-right block or an above neighboring block adjacent to the top-right point of the current block and a MVD.

In both HEVC and the JEM test model, a video encoder may signal the MVD syntax (i.e., syntax elements that represent that value of the MVD) in the bitstream so that the MVs can be reconstructed at the decoder side. The amount of data used to signal the MVD syntax may be related to the size of the MVD value. For instance, more data may be needed to signal the MVD syntax for MVDs with relatively larger values as compared to MVDs with relatively smaller values.

However, the current technique of deriving the value for each CPMV based on the value of a MV of a neighboring block of the corresponding control point may present one or more disadvantages. As one example, the current technique does not take advantage of the correlation of the affine motion model of a current block and the affine motion model of a neighboring block.

In accordance with one or more techniques of this disclosure, a video coder may determine values of motion vectors of an affine motion model of a current block of video data based on values of motion vectors of an affine motion model of a particular neighboring block of video data and values of differences between the values of the motion vectors of the affine motion model for the current block of video data and the values of the motion vectors that are derived based on the affine motion model of the neighboring block of video data. For instance, a video coder may utilize the CPMVs of the neighboring block as CPMVPs for CPMVs of the current block. As the CPMVs of the neighboring block may be correlated with the CMPVs of the current block, the differences (e.g., MVDs) between the predictors (e.g., the CPMVPs) and the motion vectors (e.g., the CMPVs) of the current block may be reduced. In this way, as the amount of data used to encode the differences may be proportional to the size of the difference, the techniques of this disclosure may improve the efficiency of video compression.

A four-parameter affine motion model has been advanced in Huawei Technologies Co, Ltd "Affine transform prediction for next generation video coding" Document ITU-T SG 16 (Study Period 2013) Contribution 1016, (hereinafter "Contribution 1016") is available from itu.int/md/T13-SG16-C-1016/en. Contribution 1016 introduces a four-parameter affine model shown below in Equation (1).

$$\begin{cases} v_x = ax - by + c \\ v_y = bx + ay + d \end{cases} \quad (1)$$

Where $(v_{0x},v_{0y})$ is the CPMV for the top-left corner of a current block and $(v_{1x},v_{1y})$ is the CPMV for the top-right corner of the current block, the affine motion model, also referred to as a motion vector field (MVF), may be represented in accordance with Equation (2) below.

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (2)$$

The four-parameter affine model shown above in Equation (1) may present one or more disadvantages. In particular, the four-parameter affine motion constrains the affine parameters of the x and y components, forcing them to have symmetric scaling properties. However, this constraint may not be true in diversified video content.

In accordance with one or more techniques of this disclosure, a video coder may selectively utilize either a four-parameter affine motion model or a six-parameter affine motion model. For instance, a video decoder may determine whether a current block is coded using the four-parameter affine motion model shown above in Equation (1) or a six-parameter affine motion model shown below in Equation (3).

$$\begin{cases} v_x = ax - by + c \\ v_y = dx + ey + f \end{cases} \quad (3)$$

In some examples, the video decoder may determine which affine motion model is used based on explicit signalling. For instance, the video coder may decode, from a bitstream, a syntax element that indicates whether the affine motion model for a current block of video data comprises a four-parameter model or a six-parameter model. In some examples, the syntax element may be coded in one or more of a video parameter set (VPS), sequence parameter set (SPS), picture parameter set (PPS), and a slice header referred to by the current block of video data. In some examples, the syntax element may be coded at the coding unit (CU) level of a CU that includes the current block of video data.

The processing and/or signaling requirements of the four-parameter model may be lower than the processing and/or signaling requirements of the six-parameter model. However, in some examples, the six-parameter model may result in prediction blocks that better match the block being coded, which may reduce the size of the residual values. As such, in some examples, a video encoder may balance the processing and signaling costs of encoding a block using a six-parameter model against the benefits of reduced residual values for the block and may select which model is more advantageous. In this way, the techniques of this disclosure may further improve the efficiency of video compression using affine motion models.

FIG. 1 is a block diagram illustrating an example video encoding and decoding system 10 that may utilize techniques for performing affine motion compensation of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for performing affine motion compensation of this disclosure. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for performing affine motion compensation of this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, processing circuitry (including fixed function circuitry and/or programmable processing circuitry), digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, according to ITU-T H.265, a video picture may be divided into a sequence of coding tree units (CTUs) (or largest coding units (LCUs)) that may include both luma and chroma samples. Alternatively, CTUs may include monochrome data (i.e., only luma samples). Syntax data within a bitstream may define a size for the CTU, which is a largest coding unit in terms of the number of pixels. A slice includes a number of consecutive CTUs in coding order. A video picture may be partitioned into one or more slices. Each CTU may be split into coding units (CUs) according to a quadtree. In general, a quadtree data structure includes one node per CU, with a root node corresponding to the CTU. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs.

Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a CTU may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTU may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the CTU with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs (or partitions of a CU) within a given CU defined for a partitioned CTU, although this may not always be the case. The TUs are typically the same size or smaller than the PUs (or partitions of a CU, e.g., in the case of intra prediction). In some examples, residual samples corresponding to a CU may be subdivided into smaller units using a quadtree structure known as a "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs) when predicted using inter-prediction. In general, a PU represents a spatial area corresponding to all or a portion of the corresponding CU, and may include data for retrieving and/or generating a reference sample for the PU. Moreover, a PU includes data related to prediction. When the CU is inter-mode encoded, one or more PUs of the CU may include data defining motion information, such as one or more motion vectors, or the PUs may be skip mode coded. Data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

Leaf-CUs may also be intra-mode predicted. In general, intra prediction involves predicting a leaf-CU (or partitions thereof) using an intra-mode. A video coder may select a set of neighboring, previously coded pixels to the leaf-CU to use to predict the leaf-CU (or partitions thereof).

A leaf-CU may also include one or more transform units (TUs). The transform units may be specified using an RQT (also referred to as a TU quadtree structure), as discussed above. For example, a split flag may indicate whether a leaf-CU is split into four transform units. Then, each TU may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, partitions of a CU, or the CU itself, may be collocated with a corresponding leaf-TU for the CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTU (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures, starting with a random access point (RAP) picture. A video sequence may include syntax data in a sequence parameter set (SPS) that characteristics of the video sequence. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Picture order count (POC) is widely used in video coding standards to identify a display order of a picture. Although there are cases where two pictures within one coded video sequence may have the same POC value, it typically does not happen within a coded video sequence. When multiple coded video sequences are present in a bitstream, pictures with a same value of POC may be closer to each other in terms of decoding order. POC values of pictures are typically used for reference picture list construction, derivation of reference picture set as in HEVC and motion vector scaling.

Motion compensation in HEVC is used to generate a predictor for the current inter block. Quarter pixel accuracy motion vector is used and pixel values at fractional positions are interpolated using neighboring integer pixel values for both luma and chroma components.

In HEVC, for each block, a set of motion information can be available. A set of motion information contains motion information for forward and backward prediction directions. Here, forward and backward prediction directions are two prediction directions of a bi-directional prediction mode and the terms "forward" and "backward" do not necessarily have a geometry meaning; instead they correspond to reference picture list 0 (RefPicList0) and reference picture list 1 (RefPicList1) of a current picture. When only one reference picture list is available for a picture or slice, only RefPicList0 is available and the motion information of each block of a slice is always forward.

For each prediction direction, the motion information must contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component.

In the HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to five candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate may correspond to a full set of motion information while an AMVP candidate may contain just one motion vector for a specific prediction direction and reference index. The candidates for both modes are derived similarly from the same spatial and temporal neighboring blocks. Further details of the spatial neighboring candidates for merge and AMVP modes are discussed below with reference to FIG. 4.

Video encoder 20 and video decoder 30 may be configured to perform motion compensation using affine motion models. For instance, as opposed to only using a translational motion model with a single two-dimensional motion vector (i.e., as in HEVC), video encoder 20 and video decoder 30 may utilize an affine motion model that includes multiple motion vectors. Further details of the use of affine motion models are discussed below.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

Video encoder 20 may further send syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS).

Video encoder 20 and video decoder 30 each may be implemented as any of a variety of suitable encoder or decoder circuitry, as applicable, such as one or more microprocessors, processing circuitry (including fixed function circuitry and/or programmable processing circuitry), digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
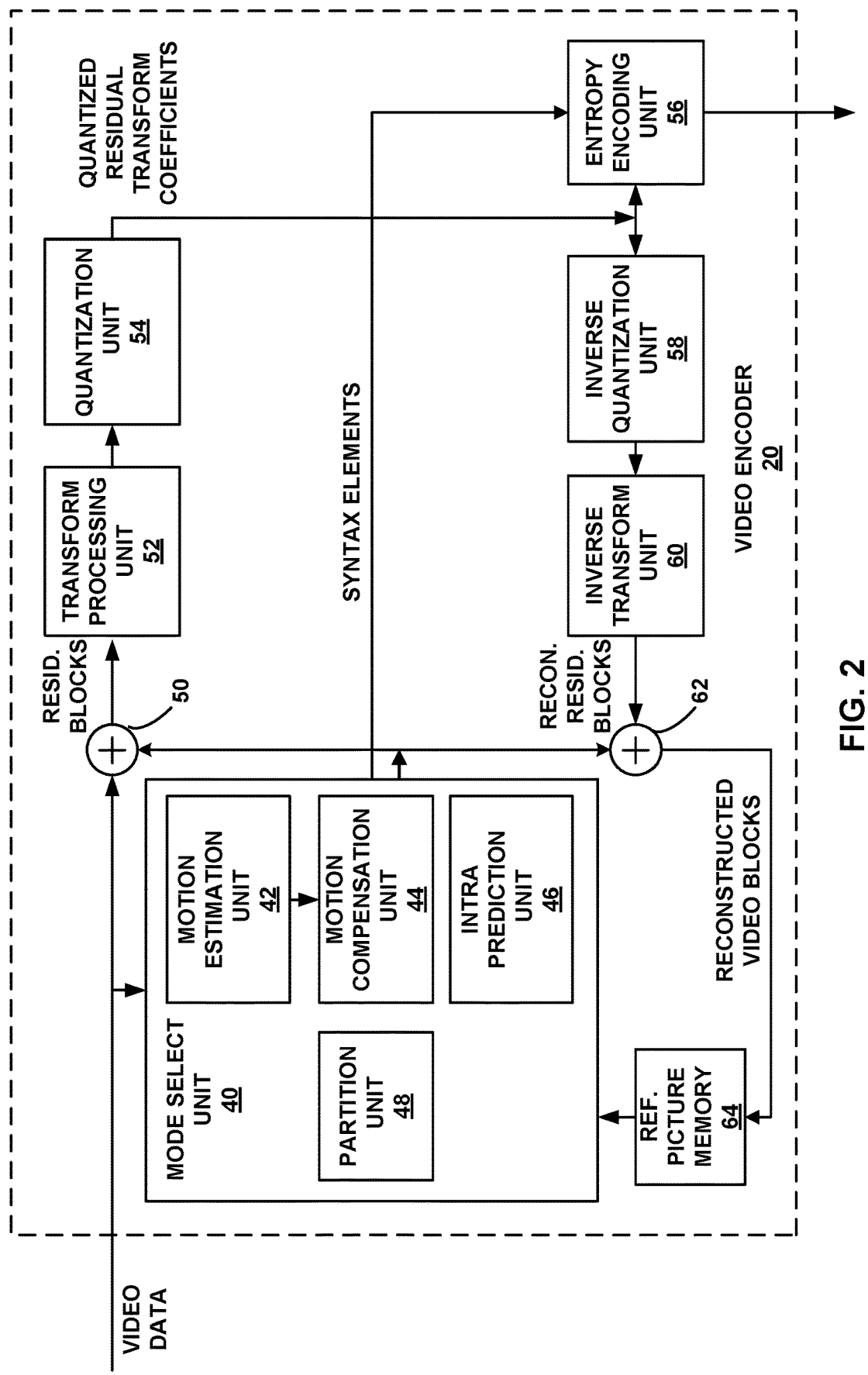
FIG. 2 is a block diagram illustrating an example of video encoder that may be configured to perform the techniques of this disclosure.

FIG. 2 is a block diagram illustrating an example of video encoder 20 that may implement techniques for performing affine motion compensation of this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into CTUs, and partition each of the CTUs into sub-CUs based on rate-distortion analysis (e.g., rate-distortion optimization). Mode select unit 40 may further produce a quadtree data structure indicative of partitioning of a CTU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Video encoder 20 may be configured to perform any of the various techniques of this disclosure discussed above with respect to FIG. 1, and as will be described in more detail below. For example, motion compensation unit 44 may be configured to code motion information for a block of video data using AMVP or merge mode in accordance with HEVC, and/or may be configured to code affine motion information or a block of video data using affine inter mode or affine merge mode in accordance with the techniques of this disclosure.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Figure 3:
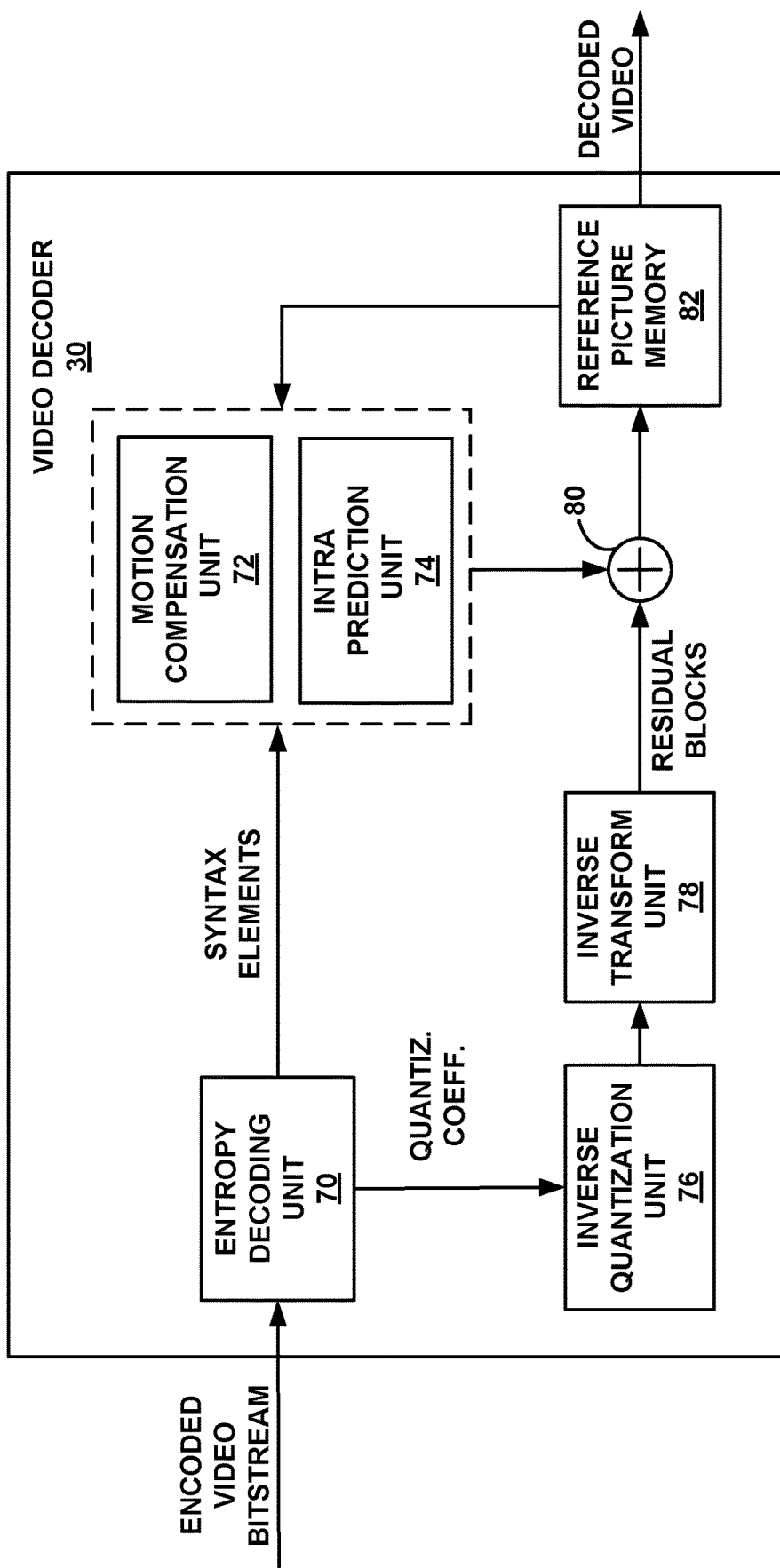
FIG. 3 is a block diagram illustrating an example of video decoder that may be configured to perform the techniques of this disclosure.

FIG. 3 is a block diagram illustrating an example of video decoder 30 that may implement techniques for performing affine motion compensation of this disclosure. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Video decoder 30 may be configured to perform any of the various techniques of this disclosure discussed above with respect to FIG. 1, and as will be discussed in more detail below. For example, motion compensation unit 72 may be configured to perform motion vector prediction using AMVP or merge mode in accordance with HEVC, and/or may be configured to perform affine motion information or a block of video data using affine inter mode or affine merge mode in accordance with the techniques of this disclosure. Entropy decoding unit 70 may decode one or more syntax elements representing how motion information is coded for the current block.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Figure 4B:
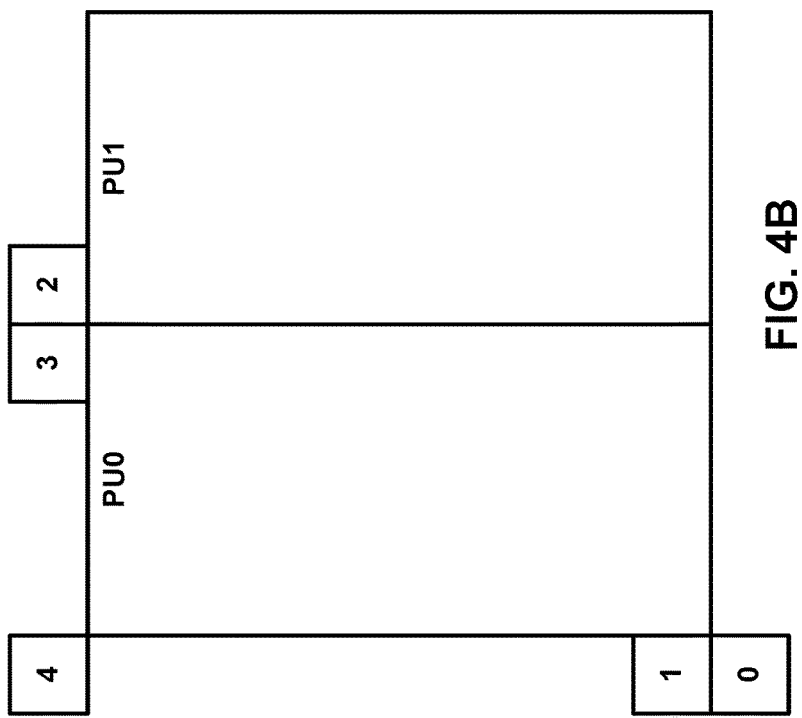
FIGS. 4A and 4B are conceptual diagrams illustrating spatial neighboring candidates in High Efficiency Video Coding (HEVC).
Figure 4A:
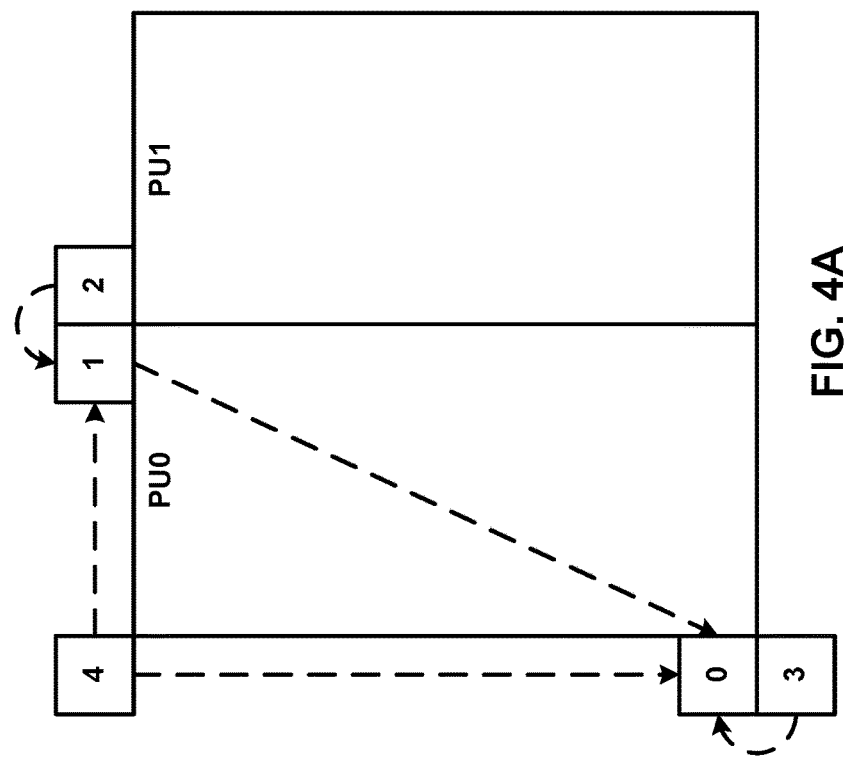

FIGS. 4A and 4B are conceptual diagrams illustrating spatial neighboring candidates in High Efficiency Video Coding (HEVC). As discussed above, spatial MV candidates may be derived from the neighboring blocks for a specific PU ($PU_0$), although the methods generating the candidates from the blocks differ for merge and AMVP modes.

FIG. 4A illustrates an example of how a video coder may derive spatial MV candidates in merge mode. In merge mode, up to four spatial MV candidates can be derived with the orders showed on FIG. 4A with numbers, and the order is the following: left (0), above (1), above right (2), below left (3), and above left (4), as shown in FIG. 4A.

FIG. 4B illustrates an example of how a video coder may derive spatial MV candidates in AVMP mode. In AVMP mode, the neighboring blocks are divided into two groups: left group consisting of the block 0 and 1, and above group consisting of the blocks 2, 3, and 4 as shown on FIG. 4B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate; thus the temporal distance differences can be compensated.

Figure 5:
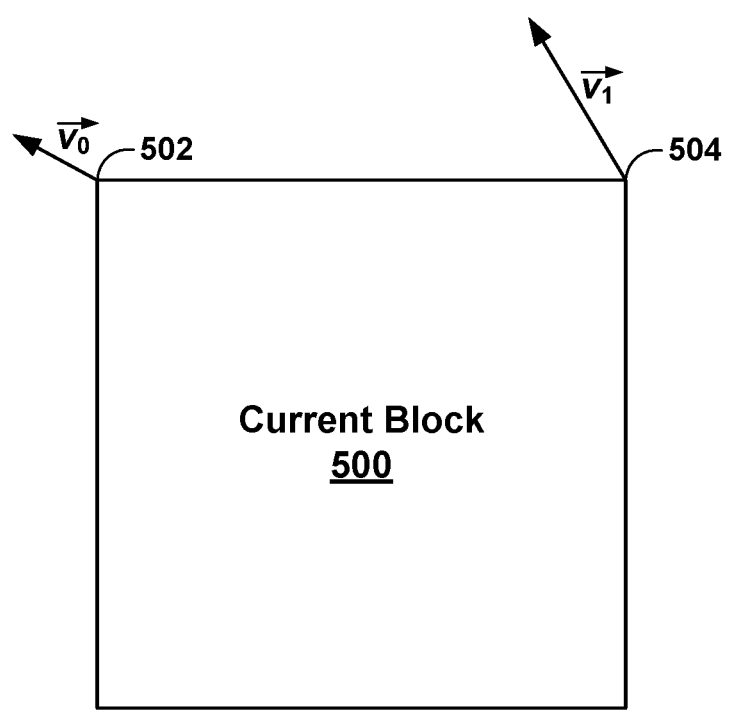
FIG. 5 is a conceptual diagram illustrating two-point motion vector affine with four affine parameters.

FIG. 5 is a conceptual diagram illustrating two-point motion vector affine with four affine parameters. As shown in FIG. 5, $(v_{0x}, v_{0y})$ denoted as $v_0$ is the CPMV for top-left corner 502 of current block 500 and $(v_{1x}, v_{1y})$ denoted as $v_1$ is the CPMV for top-right corner 504 of current block 500. As discussed above, the CMPVs for current block 500 may form a motion vector field (MVF) represented in accordance with Equation (2), above.

In the JEM test model, the affine motion prediction is only applied to square blocks. As natural extension, the affine motion prediction can be applied to non-square blocks.

Figure 6:
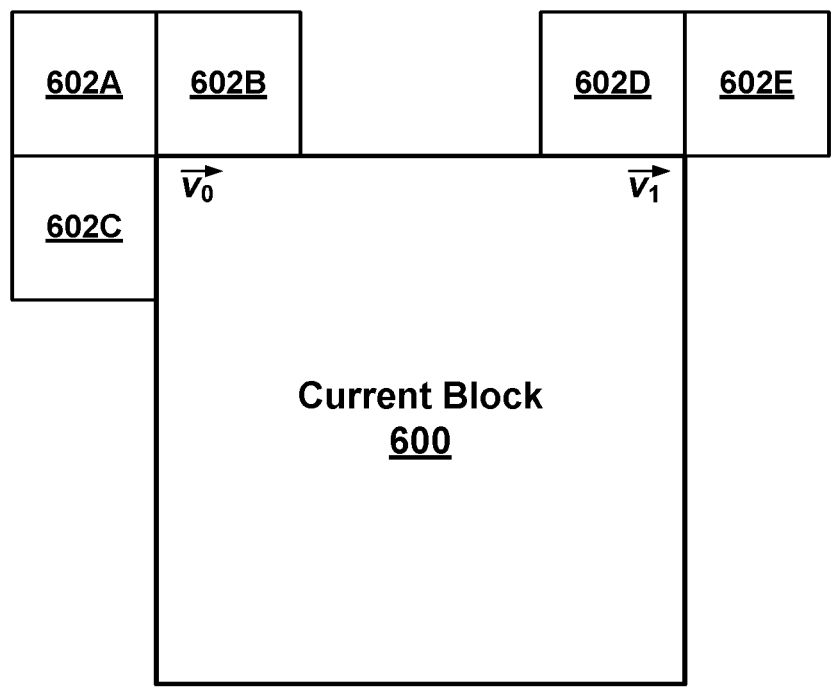
FIG. 6 is a conceptual diagram illustrating an affine inter mode.

FIG. 6 is a conceptual diagram illustrating an affine inter mode. For block (e.g., CUs/PUs) having a size that is equal to or larger than 16×16, a video coder (e.g., video encoder 20 and/or video decoder 30) may apply an affine inter (AF_INTER) mode as follows. In some examples, if the current block (e.g., current CU/PU) is in affine inter mode, the video coder may signal an affine flag in CU/PU level in the bitstream. The video coder may construct a candidate motion vector list for the current using motion vectors of neighboring valid reconstructed blocks of the current block. For instance, as shown in the example FIG. 6, the candidate motion vector predictors for the top-left CPMV $v_0$ may be selected from the motion vectors of the block 602A, 602B, and 602C (i.e., neighboring blocks in contact with the top-left corner of current block 600). The video coder may scale the motion vector from the neighbour block according to the reference list and the relationship among the POC of the reference for the neighbour block, the POC of the reference for the current CU/PU and the POC of the current CU/PU. The video coder may perform a similar approach to select candidate motion vector predictors for top-right CPMV $v_1$ from the neighbour block 602D and 602E (i.e., neighboring blocks in contact with the top-right corner of current block 600). As such, in some examples, the candidate list may be represented as $\{(v_0,v_1)|v_0=\{(v_{602A},v_{602B},v_{602C}\}, v_1=\{v_{602D},v_{602E}\}\}$.

If the number of candidate list is smaller than a threshold (e.g., two, three, or four), the video coder may assign the candidates of AMVP to $v_0$ and $v_1$. The video coder may utilize the rate-distortion optimization (RDO) cost of the current block to determine which $(v_0,v_1)$ to select as the control point motion vector prediction (CPMVP) of the current block. The video coder may signal the index to indicate the position of the CPMVP in the candidate list in the bitstream.

Based on the CPMVP of the current affine block, the video coder may apply affine motion estimation to determine the CPMV. The video coder may code a representation of a difference between CPMV and the CPMVP in the bitstream.

The video coder may perform affine motion compensation prediction as described above to generate the residues of the current block. The video coder may transform and quantize the generated residues of the current block, and code the quantized residues into the bitstream (e.g., in a manner similar to HEVC).

Figures 7A, 7B:
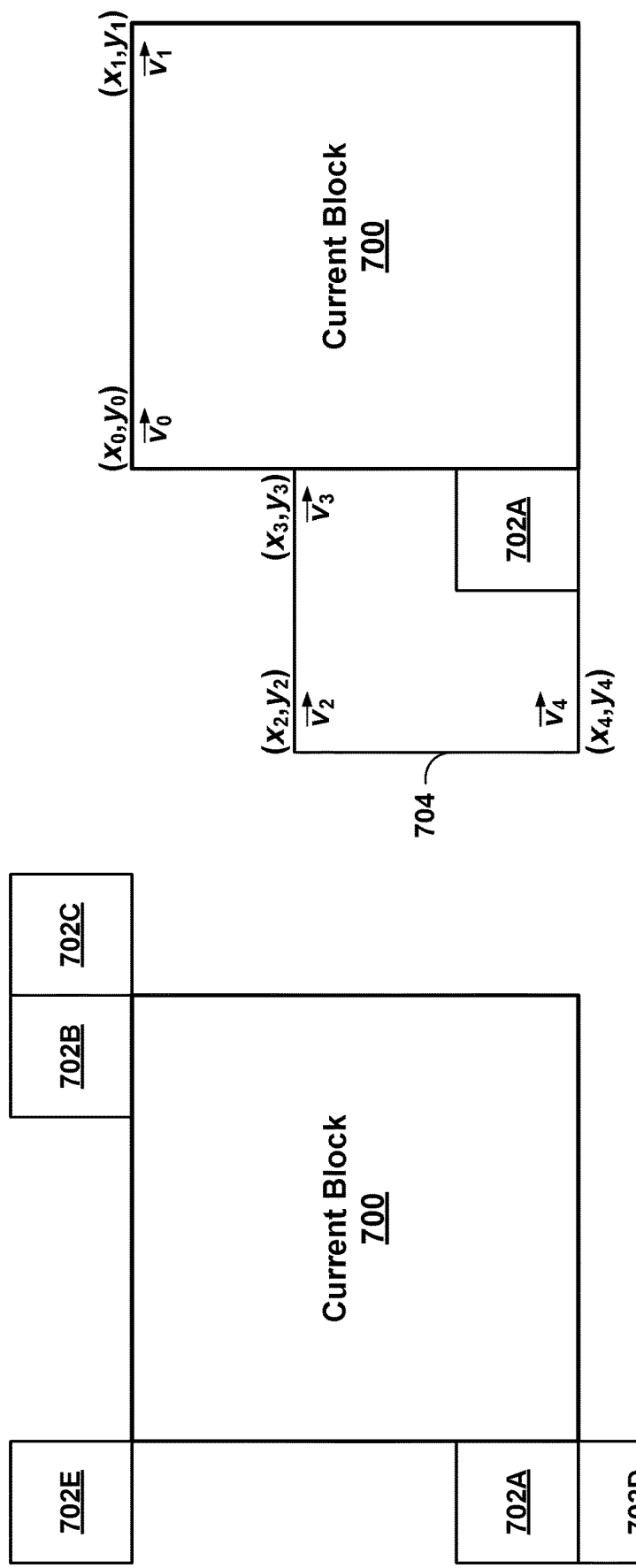
FIGS. 7A and 7B are conceptual diagrams illustrating candidates for an affine merge mode.

FIGS. 7A and 7B are conceptual diagrams illustrating candidates for an affine merge mode. When applying affine merge (AF_MERGE) mode to a current bock, a video coder (e.g., video encoder 20 and/or video decoder 30) may obtain the first block coded with affine mode from the valid neighbour reconstructed blocks of the current block. In some examples, the video coder may parse the neighbor reconstructed blocks in a particular selection order to obtain the first block coded with affine mode. FIG. 7A illustrates an example selection order. As shown in FIG. 7A, the selection order may be as follows: left block 702A, above block 702B, above-right block 702C, left-bottom block 702D, to above-left block 702E.

FIG. 7B illustrates an example where the left block is the first block in the selection order coded with affine more. As shown in FIG. 7B, the video coder may derive the motion vectors of the top-left corner ($v_2$), above-right corner ($v_3$) and left-bottom corner ($v_4$) of CU/PU 704 which contains the selected block 1002A. The video coder may determine/calculate the motion vector of the top-left corner of current block 700 (i.e., $v_0$) and the motion vector of the top-right corner of current block 700 (i.e., $v_1$) based on the derived motion vectors of the selected block (i.e., $v_2$, $v_3$, and $v_4$).

The video coder may determine the MVF of current block 700 based on the CPMVs of current block 700 $v_0$ and $v_1$ in accordance with the simplified affine motion model described above in Equation (2). The video coder may apply affine MCP using the MVF as described above.

In order to identify whether the current block is coded with affine merge mode, the video coder may signal an affine flag in the bitstream when there is at least one neighbour block coded in affine mode. If no affine block neighbour exists for the current block, the video coder may omit coding the affine flag in the bitstream or may code the affine flag to indicate that no affine block neighbor exists for the current block.

As discussed above, the existing affine motion model methods (e.g., in the JEM test model and Contribution 1016) present several problems and/or have several disadvantages. As one example, in Contribution 1016, the four-parameter affine motion has posed a constraint on the affine parameters in MVx and MVy forcing them to have symmetric scaling properties. This constraint may not be true in diversified video content.

As another example, the affine merge mode relies on a pre-defined checking order which is mainly relying on the bottom-left corner and above-right corner. This pre-defined order has placed top-left corner in the lowest priority, while this corner information is heavily used in the following affine model derivation.

As another example, the affine merge can only inherit the neighboring model by warping the neighboring block corner MV to the current block corner. There is no flexibility to change or adjust the affine model parameters when inheriting the neighboring affine model.

In accordance with one or more techniques of this disclosure, a video coder may code a syntax element that indicates how a predictor block of video data is identified. For instance, a video coder may code a syntax element that indicates whether a four-parameter or a six-parameter affine model is used to identify a predictor block of video data for a current block of video data. By enabling selection between a four-parameter and a six-parameter affine model, the techniques of this disclosure may enable the motion vectors to have non-symmetric scaling properties, which may improve coding efficiency.

In some examples, the video coder may code the syntax element at the coding unit (CU) level. For instance, a flag may be introduced in the CU level to indicate whether four-parameter or six-parameter affine motion model is used for a current block in the CU.

In some examples, the video coder may code the syntax element in a skip mode syntax or a merge mode syntax referred to by the current block of video data. For instance, a flag may be introduced in the Skip or Merge mode to indicate whether four-parameter or six-parameter affine motion model is used for the current block.

In some examples, the video coder may code the syntax element in an inter mode syntax referred to by the current block of video data. For instance, a flag may be introduced in the inter mode (if the current block is neither Skip, nor Merge mode) to indicate whether four-parameter or six-parameter affine motion model is used for the current block.

In some examples, as opposed to only indicating whether a predictor block of video data for a current block of video data is identified using a four-parameter affine model or a six-parameter affine model, a video coder may code the syntax element to indicate whether a predictor block of video data for a current block of video data is identified using a single motion vector, a four-parameter affine model, a six-parameter affine model, or switchable four/six-parameter affine model. For instance, one syntax element in a sequence parameter set (SPS), a Picture Parameter Set (PPS) and/or slice header may be present to signal which one of the following cases is used for current sequence/picture/slice, 1) disabled affine, 2) 4-parameter affine, 3) 6-parameter affine, 4) 4-/6-switchable affine. The syntax element can be coded using unary, truncated unary, or fixed length codeword.

In some examples, a video coder may code an enabling syntax element that indicates whether a number of parameters used in affine models used to identify predictor blocks of video data is switchable. For instance, the video coder may code a flag in a sequence parameter set (SPS), a Picture Parameter Set (PPS) and/or slice header to indicate whether switchable affine model is enabled for pictures referring to the SPS or PPS or the slice header.

Where the enabling syntax element indicates that that the number of parameters used in affine models used to identify predictor blocks of video data is switchable (e.g., where the enabling syntax element is a flag with value 1), the video coder may code a syntax element that indicates whether a four-parameter or a six-parameter affine model is used to identify a predictor block of video data for a current block of video data as discussed above. For instance, where the enabling syntax element indicates that that the number of parameters used in affine models used to identify predictor blocks of video data is switchable (e.g., where the enabling syntax element is a flag with value 1), four- and six-parameter affine models are both enabled and an additional flag for each block may be signaled to indicate the usage of four or six-parameter models.

Where the enabling syntax element indicates that that the number of parameters used in affine models used to identify predictor blocks of video data is not switchable (e.g., where the enabling syntax element is a flag with value 0), the video coder may determine that a four-parameter affine model is used (i.e., if affine is used). In such examples, the video coder may omit coding of the syntax element that indicates whether a four-parameter or a six-parameter affine model is used to identify the predictor block of video data for the current block of video data.

In some examples, one or more of the above-described syntax elements (i.e., the affine parameter (four-parameter or six-parameter) flag and/or the enabling syntax element) may be coded using a CABAC context model depending on neighboring block affine parameter usage. In one example, the current affine parameter context index CtxVal depends on the left and above neighboring blocks. If the left neighboring block is not available, or not affine mode, or six-parameter affine, the leftCtx is set equal to 0; otherwise (left available, and six-parameter affine mode) the leftCtx is set equal to 1. Similar calculation can be calculated for the above neighboring block to get aboveCtx. Then CtxVal of the current block is set equal to leftCtx+aboveCtx. In this case, CtxVal is in the range of [0, 2] inclusively. Other variations of setting leftCtx (aboveCtx) are also possible. For instance, leftCtx (aboveCtx) is set equal to 0 if left (above) neighboring block is not available, or not affine coded; 1 if the left (above) neighboring block is using four-parameter affine; 2 if the left (above) neighboring block is using six-parameter affine. In this case, CtxVal is in the range of [0, 4] inclusively.

In some examples, one or more of the above-described syntax elements (i.e., the affine parameter (four-parameter or six-parameter) flag and/or the enabling syntax element) may be coded using CABAC context model depending on the current block size and a block size threshold may be used to differentiate different contexts. For instance, context 0 is used for block size equal or smaller than 16×16; while context 1 is used for block size larger than 16×16. The threshold may be predefined or signaled in bitstream. The size of the block could be specified by the width and height of the current block separately or jointly. For example, the size can be represented by the value of width*height.

In some examples, one or more of the above-described syntax elements (i.e., the affine parameter (four-parameter or six-parameter) flag and/or the enabling syntax element) can also be coded using CABAC bypass mode without any context.

Figure 8:
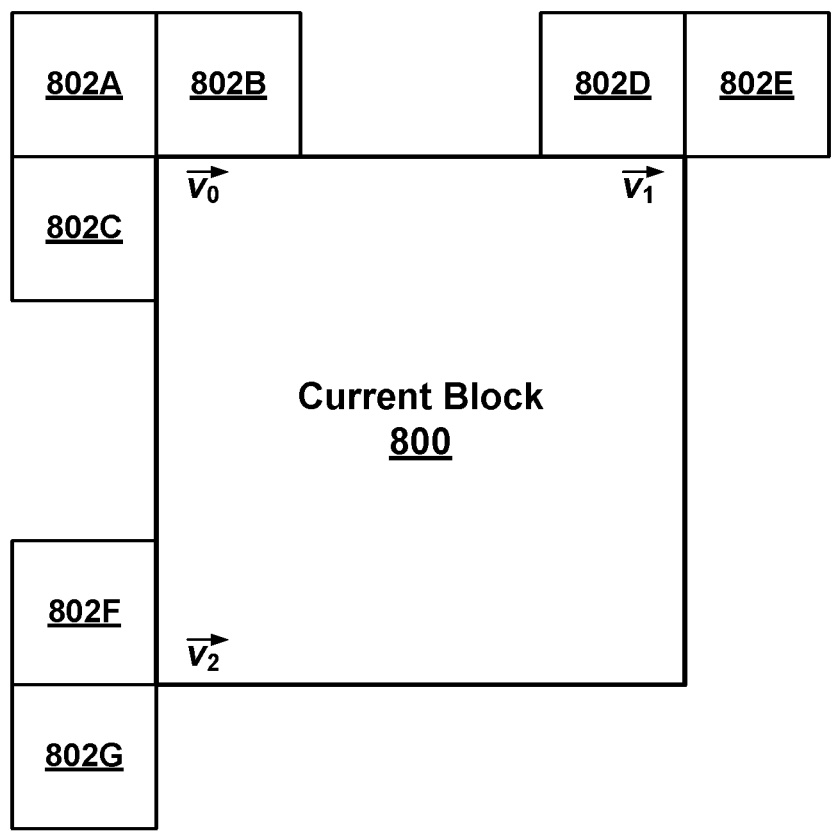
FIG. 8 is a conceptual diagram illustrating a six-parameter affine motion model, in accordance with one or more techniques of this disclosure.

FIG. 8 is a conceptual diagram illustrating a six-parameter affine motion model, in accordance with one or more techniques of this disclosure. A four-parameter affine model may include two motion vectors and a six-parameter affine model may include three motion vectors. In some examples, such as when the six-parameter affine motion model is used, a video coder may code three motion vector differences (MVD) in the bitstream for inter mode. The three motion vector predictors may be generated from neighboring motion vectors, or derived from neighboring motion vectors. The neighboring motion vectors may or may not be affine motion vectors. For instance, three motion vectors in the current block $v_0$ (MV0), $v_1$ (MV1), and $v_2$ (MV2) in the three corners of current block 800 may to be coded as shown in FIG. 8. In order to predict $v_0$, the motion vectors of 802A (above-left), 802B (above) and 802C (left) are possible candidates. Similarly, the motion vectors of 802D (above) and 802E (above-right) are possible candidates for predicting $v_1$, and the motion vectors of 802F (left) and 802G (below-left) are possible candidates for predicting $v_2$. In some examples, the first available candidate for each position in a predefined checking order is directly used as its predictor.

The three motion vector predictors can be selected from a list of combinations using a validation, sorting and de-duplication scheme and only the first few K combinations are used as possible predictors, where K>=1. In some examples, the video coder may generate a full combination of all the predictors using neighboring available motion vectors. As shown in FIG. 8, there may be a total of 3×2×2=12 combinations.

In the first step, for each combination, the video coder may perform a validation checking. If MV0 is equal to MV1 and MV0 is equal to MV2, this combination is invalid; otherwise, it is valid. In the second step, the video coder may perform a sorting based on parameter similarity. For instance, if the current block is using six-parameter affine mode as follows where a, b, c, d, e, and f are model parameters, the affine motion model may be represented in accordance with Equation (3), reproduced below.

$$\begin{cases} v_x = ax - by + c \\ v_y = dx + ey + f \end{cases} \quad (3)$$

Using the six-parameter affine model, the three corner motion vectors can be represented as follows:

$$\begin{cases} MV0\_v_x = c \\ MV0\_v_y = f \end{cases} \quad (4)$$

$$\begin{cases} MV1\_v_x = a \times \text{width} + c \\ MV1\_v_y = d \times \text{width} + f \end{cases}$$

$$\begin{cases} MV2\_v_x = b \times \text{height} + c \\ MV2\_v_y = e \times \text{height} + f \end{cases}$$

Figure 9:
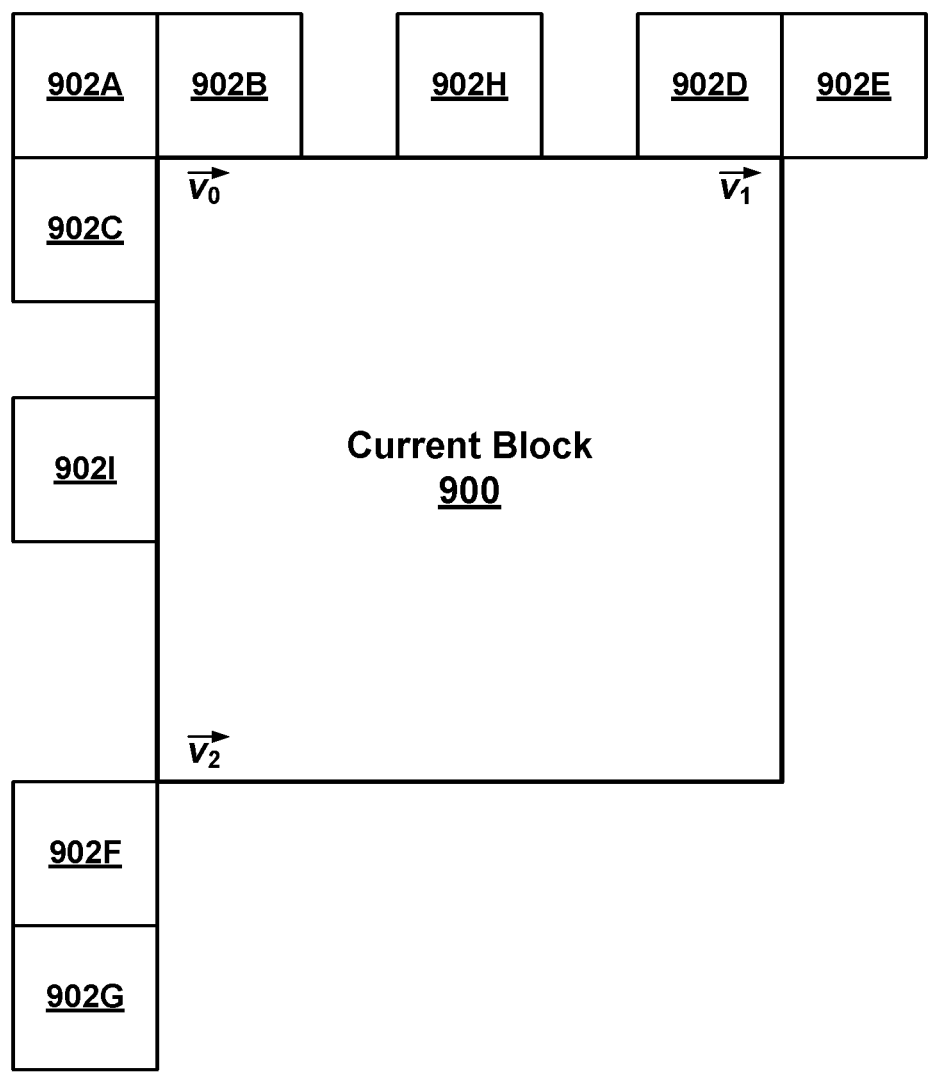
FIG. 9 is a conceptual diagram illustrating affine motion vector evaluation, in accordance with one or more techniques of this disclosure.

FIG. 9 is a conceptual diagram illustrating affine motion vector evaluation, in accordance with one or more techniques of this disclosure. In order to evaluate the model correctness, this disclosure introduces a parameter called estimated difference (ED). At the same time, two neighboring block MVs may be used in the evaluation process highlighted in neighboring block 902H and 902I which located half in the width and half in the height as shown in FIG. 9. Thus there is:

$$\begin{cases} MVH\_v_x = a \times \text{width}/2 + c \\ MVH\_v_y = d \times \text{width}/2 + f \end{cases} \quad (5)$$

$$\begin{cases} MVI\_v_x = b \times \text{height}/2 + c \\ MVI\_v_y = e \times \text{width}/2 + f \end{cases}$$

Among all the combinations, the first few K least ED combinations may be selected as the final predictor. The following is an example ED calculation:

$$\Delta a \times \text{height} = \text{abs}((MV1\_v_x - MV0\_v_x) - (MVH\_v_x - MV0\_v_x) \times 2) \times \text{he}$$

$$\Delta b \times \text{width} = \text{abs}((MV2\_v_x - MV0\_v_x) - (MVI\_v_x - MV0\_v_x) \times 2) \times \text{wid} \quad (6)$$

$$\Delta d \times \text{height} = \text{abs}((MV1\_v_y - MV0\_v_y) - (MVH\_v_x - MV0\_v_y) \times 2) \times \text{h}$$

$$\Delta e \times \text{width} = \text{abs}((MV2\_v_x - MV0\_v_y) - (MVI\_v_y - MV0\_v_y) \times 2) \times \text{wid}$$

The video coder may set ED equal to the summation of the four elements above.

$$ED = \Delta a + \Delta b + \Delta d + \Delta e \quad (7)$$

In some examples, the video coder may perform a sorting based on affine motion vector similarity. In one example, given three motion vectors, the video coder may predict the fourth motion vector using six-parameter affine model. The prediction difference may be added in ED and the first few combination with smallest ED may be chosen as MV prediction candidates.

The motion vector predictors can be generated across the other predictors using four-parameter affine model. For instance, given the first two reconstructed MVs, the video coder may generate a third MV predictor using the four-parameter affine model. For example, the MV predictor for MV2 can by derived based on MV0 and MV1 of the current block by using Equation (2) above.

In some examples, the affine motion vector predictor can be generated from the previously coded affine motion vectors within the current frame. In one example, a set of N (N>=0) affine motion vectors can be initialized at the beginning of each frame, and after coding each affine block, the list is updated with the recently coded affine motion vectors and an index is signaled to indicate the chosen affine motion predictor among the list. The video coder may use truncated unary, or flag plus truncated unary code to code the index.

In some examples, a set of K (K>=0) affine model parameters are initialized at the beginning of each frame. After each affine block is coded, the set of parameters are updated with the coded affine model parameters. For instance, in the six-parameter model, the video coder may maintain a list of N vectors, where each vector being represented by $\{a_i, b_i, c_i, d_i, e_i, f_i\}$ with six elements. Similarly, in the four-parameter mode, the video coder may maintain a list of M vectors $\{a_j, b_j, c_j, d_j\}$. Note that M and N may or may not be the same.

In above-mentioned techniques, for affine inter mode, the video coder may derive the motion vector predictor of each MV of the affine model individually, by using the MVs of its neighboring position. In accordance with one or more techniques of this disclosure, when affine motion is used by a neighboring block, a video coder may use the affine motion model of the neighboring block can predict all the MVs of the affine motion model of the current block, i.e. the predictors of MV0 and MV1 (and MV2 for six-parameter models) of the current affine model is extrapolated from the affine motion of a neighboring block, and then code the MVD.

The different prediction methods mentioned above can be used jointly. For example, a flag or index can be signaled to indicate which MV prediction method is used. In some examples, the predictors derived by using the different prediction methods mentioned above are used to generate a MV predictor candidate list, and a flag or index is used to indicate which candidate is used to predict the current affine motion model.

When a four-parameter affine motion model is used, either "MV0 and MV1" or "MV0 and MV2" ($v_0$ and $v_1$ or $v_0$ and $v_2$ as shown in FIG. 8) can be used to represent the affine motion of the current CU/PU. When width and height of the current CU/PU is different, a certain kind of rule can be used to determine which pair of motion vectors is used.

In one example, when the width is larger than or equal to (or just larger than) height or the ration of width and height is greater than a threshold, the pair of MV0 and MV1 may be used, otherwise the pair of MV0 and MV2 may be used. The threshold may be block size dependent or width/height dependent.

The techniques can be applied to both affine merge mode and affine inter mode, or only applied in one of them, e.g., affine merge mode.

The video coder may use a particular checking/evaluation order to select a neighboring block (e.g., in merge mode). In some examples, the video coder may use the following order to check neighboring blocks for affine merge mode: Above→Left→Above Left→Above Right→Below Left. This order corresponds to the blocks in FIG. 9 as D→F→A→E→G. When the neighboring blocks are not available or not affine coded block, the video coder may apply the checking in the pre-defined order until all the five candidates are checked.

In some examples, if there are no available neighboring affine motion blocks, the video coder may insert certain default or pre-defined or pre-calculated affine motion models as the candidate for the merge mode. The inserted models can be initialized as the picture level, and may be updated on the fly.

In some examples, if there are no valid neighboring affine models, the video coder may perform the insertion of default or pre-defined or pre-calculated affine motion models after checking the neighboring blocks according to the "Above→Left→Above Left→Above Right→Below Left" order.

In some examples, the video coder may code an affine merge index to indicate which neighboring affine models are copied for the current block and truncated unary, or unary, or exponential Golomb, or Golomb family codeword, or concatenation of these can be used to code the index.

Switchable four-parameter and six-parameter affine model derived/inferred from other information. In some examples, the video coder may derive the affine parameter from inter prediction direction information. For each block, if it is coded using inter mode, the prediction reference frame index can be from refList0, or from refList1, or both refList0 and refList1. In accordance with one or more techniques of this disclosure, when uni-prediction is used (either predicted from refList0, or predicted from refList1), a video coder may use a six-parameter affine model in which three motion vector differences are coded in the bitstream. When bi-prediction is used (predicted from both refList0 and refList1), a video coder may use a four-parameter affine model in which two motion vector differences are coded in the bitstream. In some of such examples, the video coder may omit coding of syntax element that explicitly indicate whether a four-parameter or a six-parameter affine model is used to identify one or more predictor blocks of video data for a current block of video data.

In accordance with one or more techniques of this disclosure, for bi-prediction block, when L1ZeroMVDFlag is on, a video coder may enable six-parameter affine model for refList1 although there is no MVD transmitted. In this case, the video coder may generate the motion compensated predictor through the six-parameter affine model established by the three motion vector predictors In some examples, the affine parameter can be derived from neighboring block. If the majority of neighboring blocks are using four-parameter affine mode, the current block also uses four-parameter affine model. Similarly, when the majority of neighboring blocks are using six-parameter affine model (number of six-parameter affine is larger than that of four-parameter affine), the current block also uses six-parameter affine model. A counter can be used to calculate the number of neighboring blocks in certain unit size (for 4×4 block) in determining the majority neighboring affine usage. When there is no neighboring affine model, six-parameter affine model is used as a default mode (alternatively, four-parameter affine model is used as default). When the number of four-parameter affine model is equal to that of six-parameter model, six-parameter affine model is used as default (alternatively, four-parameter affine model is used as default).

Cross-frame determination of affine model flags and motion vectors. In accordance with one or more techniques of this disclosure, a video coder may use the cross-frame affine motion model parameters instead of explicitly signaling the affine parameter flags (four or six-parameter mode) or affine motion vector information. In one example, the current block inherits the affine parameter model flag from the collocated block. The collocated block is from the same location but in the previously coded picture at the same temporal level. The collocated block may or may not have the same partition size with the current block. In accordance with one or more techniques of this disclosure, a video coder may check all the sub-blocks (in the unit of 4×4) in the collocated region, and the majority of affine model is used for the current block. If there is no affine model in the collocated region, the video coder may explicitly code the four or six-parameter switching flag. In some examples, 6 (or 4)-parameter affine is used as default. In some examples, to reduce the complexity, the first affine sub-block in the collocated region in the raster scanning order is checked and inherited by the current block.

In another example, the current block inherits the affine motion model parameters {a, b, c, d, e, f} or {a, b, c, d} directly from the collocated block. The collocated block is from the same location but in the previously coded picture with the same temporal level. The collocated block may or may not have the same partition size with the current block. In accordance with one or more techniques of this disclosure, a video coder may check all the sub-blocks (in the unit of 4×4) in the collocated region, and the current block inherits the motion model parameters of the majority affine area. If there is no affine mode in the collocated region, the video coder may explicitly code a four or six-parameter switching flag. In some examples, six (or four)-parameter affine is used as default. In some examples, to reduce the complexity, the first affine sub-block in the collocated region in the raster scanning order is checked and inherited by the current block. In some examples, a combination of the above examples can be used together. A video coder may code a flag to indicate if such an inheritance is used or not in different levels, such as PU, CU level, PPS, or SPS.

Affine motion compensation given the affine parameter information. In the reconstruction process, given three motion vector (for instance the corner motion vector in the current block), a six-parameter affine model can be established by solving Equation (4). Given the six-parameter model, the per-pixel motion vector can be calculated by substituting the pixel position (x,y) into Equation (3). To reduce the motion compensation complexity, one motion vector can be used for each sub-block K×K, where K is an integer equal to or larger than 1. The representative motion vector can be calculated using the top-left pixel position within the K×K sub-block, or using the center position of the K×K sub-block. The size K can be signaled explicitly, or set as a default value, or calculated on the fly based on whether the group of pixel share the same motion vector.

Affine motion vector coding. Predictors from the neighboring valid (in terms of affine model validation) and de-duplicated motion vectors may be used to identify/predict the current affine motion vector. Predictors from the latest previously de-duplicated coded affine motion vectors may be maintained to identify/predict the current affine motion vector. The number of predictors may be K where K is an integer equal or larger than 1. Such predictors form an affine predictor list. K may be predefined or signaled in bitstream.

In some examples, a combination of both of the above techniques may be used to maintain the predictor list. For instance, a video coder may use predictors from the neighboring valid (in terms of affine model validation) and de-duplicated motion vectors along with predictors from the latest previously de-duplicated coded affine motion vectors to identify/predict the current affine motion vector.

The video coder may explicitly signal a predictor index in the bitstream to indicate the predictor usage. Three MVDs may be coded in case of six-parameter model, while two MVDs may be coded in case of four-parameter model.

The MVD may use different binarization method from traditional MVD coding. In one example, the affine MVD is coded using a separate context modeling. In another example, the affine MVD coding shares the same MVD coding context modeling with traditional inter MVD coding (i.e., as in HEVC).

The MVD may use different binarization method for each MVD based on the relative location in the block with either four-parameter or six-parameter affine model. In one example, the affine MVD may be coded using different context modeling based on the relative location in the block with either four-parameter or six-parameter affine model.

A flag may be signaled to indicate whether the MVD in both directions (X and Y directions) are zero for one or all of the affine motion vectors to further improve the motion vector coding. If such a flag (AllZeroFlag) is 1, a novel MVD coding is introduced to jointly code MVD_x and MVD_y. Specifically, if AllZeroFlag is 1, both MVD_x and MVD_y are inferred to be zero; otherwise, if MVD_x is zero, MVD_y must be nonzero. In this case, abs(MVD_y)−1 is coded. In other words, for each motion vector, a flag AllZeroFlag is signaled followed by two MVD coding if AllZeroFlag is zero. For four-parameter affine, for each list, two AllZeroFlags are coded; while for six-parameter affine, for each list, three AllZeroFlags are coded.

In some examples, AllZeroFlag can be extended and represent all zero MVD in both reference lists in bi prediction. For instance, in four-parameter affine, totally two AllZeroFlags are coded for two reference lists; in six-parameter affine, totally three AllZeroFlags are coded for two reference lists.

Figure 10:
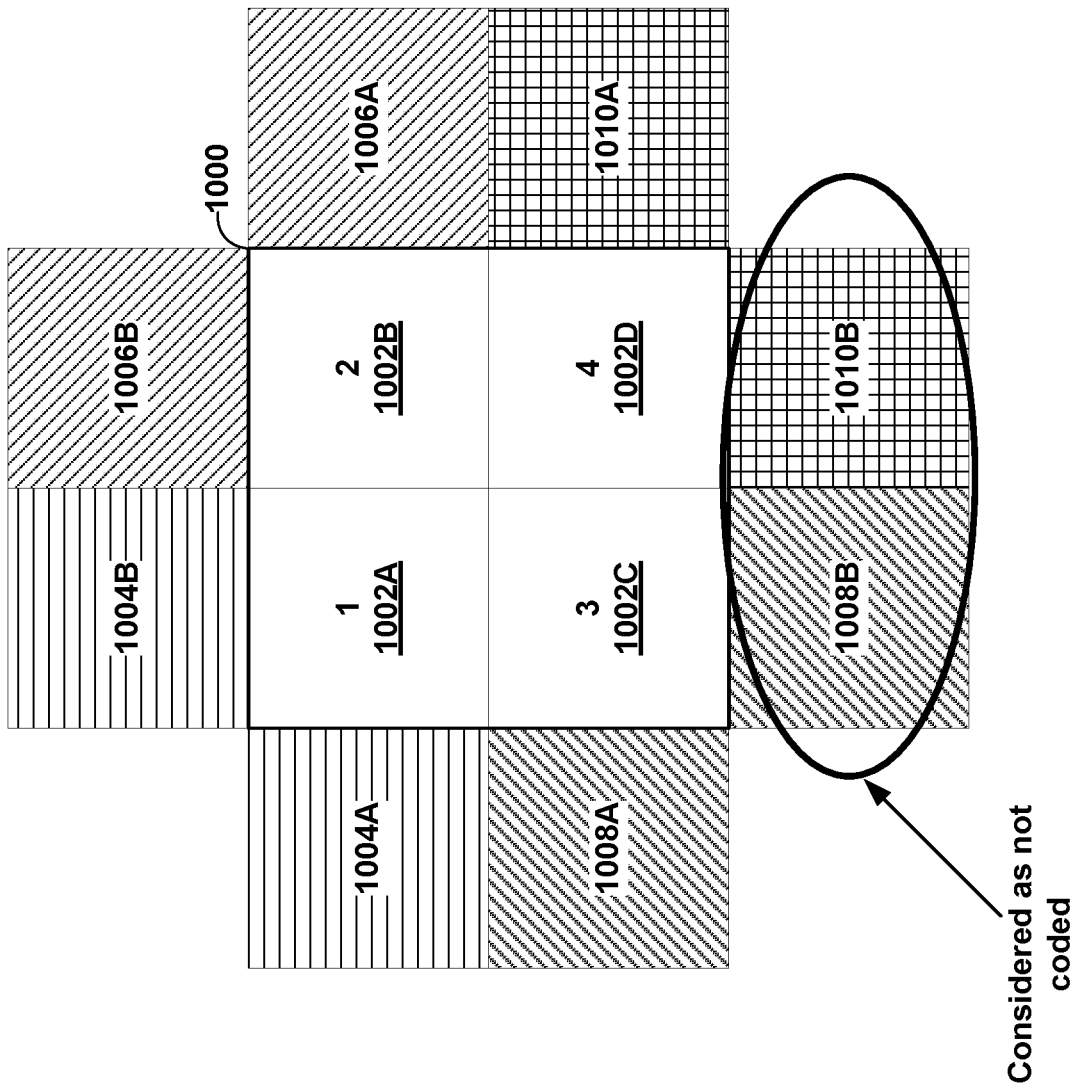
FIG. 10 is a conceptual diagram illustrating overlapped block motion compensation (OBMC) in H.263.

FIG. 10 illustrates an example of overlapped block motion compensation (OBMC). Proposed in the development of H.263, OBMC is performed on an 8×8 block, and motion vectors of two connected neighboring 8×8 blocks are used for a current block. For example, for a first 8×8 block in current macroblock, besides the motion vector of the first 8×8 block, the above and left neighboring motion vectors of the first 8×8 block are also applied to generate two additional prediction blocks. Similarly, for a second 8×8 block in the current macroblock, besides the motion vector of the second 8×8 block, the above and right neighboring motion vectors of the second 8×8 block are also applied to generate two additional prediction blocks. For instance, in the example of FIG. 10, the motion vectors of block 1004A and block 1004B may be used to generate additional prediction blocks for 8×8 block 1002A of 16×16 macroblock 1000, and the motion vectors of block 1006A and block 1006B may be used to generate additional prediction blocks for 8×8 block 1002B of macroblock 1000. In this way, each pixel in the current 8×8 block may have three prediction blocks and weighted average of these three prediction values may be used as the final prediction block.

When a neighboring block is not coded or coded as intra (i.e., the neighboring block does not have an available motion vector), the motion vector of current 8×8 block is used as the neighboring motion vector. Meanwhile, for the third and fourth 8×8 block of current macroblock (as shown in FIG. 10), the below neighboring block is always not used. For instance, as shown in the example of FIG. 10, the motion vector of block 1008B is not used to generate an additional prediction block for 8×8 block 1002C because block 1008B is considered not to be coded and the motion vector of block 1010B is not used to generate an additional prediction block for 8×8 block 1002D because block 1010B is considered not to be coded. In other words, for each macroblock, no motion information from macroblocks below it will be used to reconstruct the pixels of the current macroblock during the OBMC.

Figure 11B:
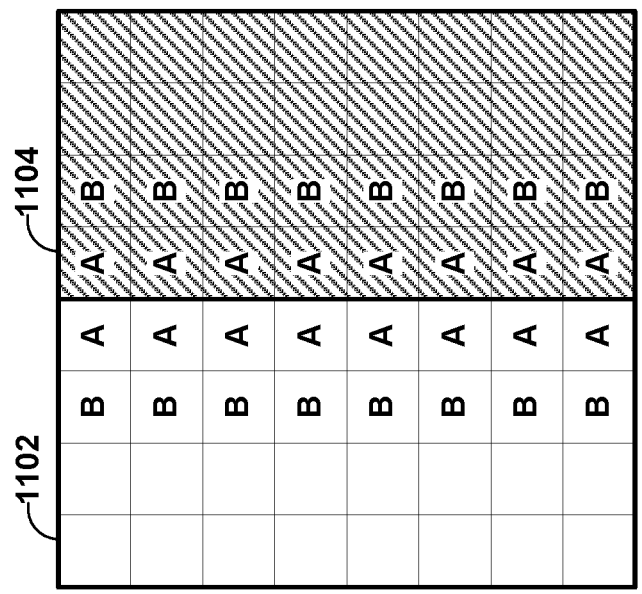
FIGS. 11A and 11B are conceptual diagrams illustrating OBMC on top of HEVC.
Figure 11A:
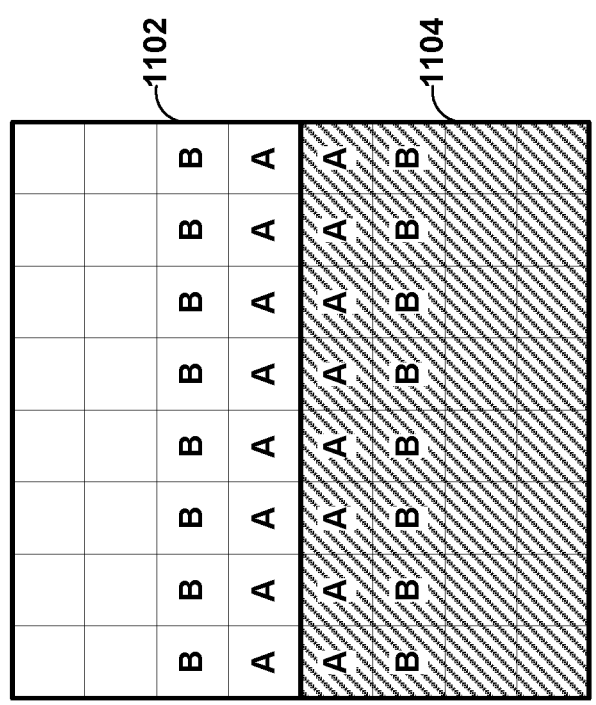

FIGS. 11A and 11B are conceptual diagrams illustrating OBMC in HEVC. In HEVC, OBMC was also proposed to smooth the PU boundary in U.S. Patent Application Publication No. 2013/0128974A1 and U.S. Patent Application Publication No. 2012/0177120A1. An example of the proposed method is illustrated FIGS. 11A and 11B. In FIGS. 11A and 11B, the white regions each are a first PU 1102 (PU0) and the shaded regions each are a second PU 1104 (PU1). When a CU contains two (or more) PUs, lines/columns near the PU boundary are smoothed by OBMC. For pixels marked with "A" or "B" in PU0 1102 or PU1 1104, two prediction values are generated, e.g., by applying motion vectors of PU0 and PU1 respectively, and weighted average of them are used as the final prediction.

Figures 12A, 12B:
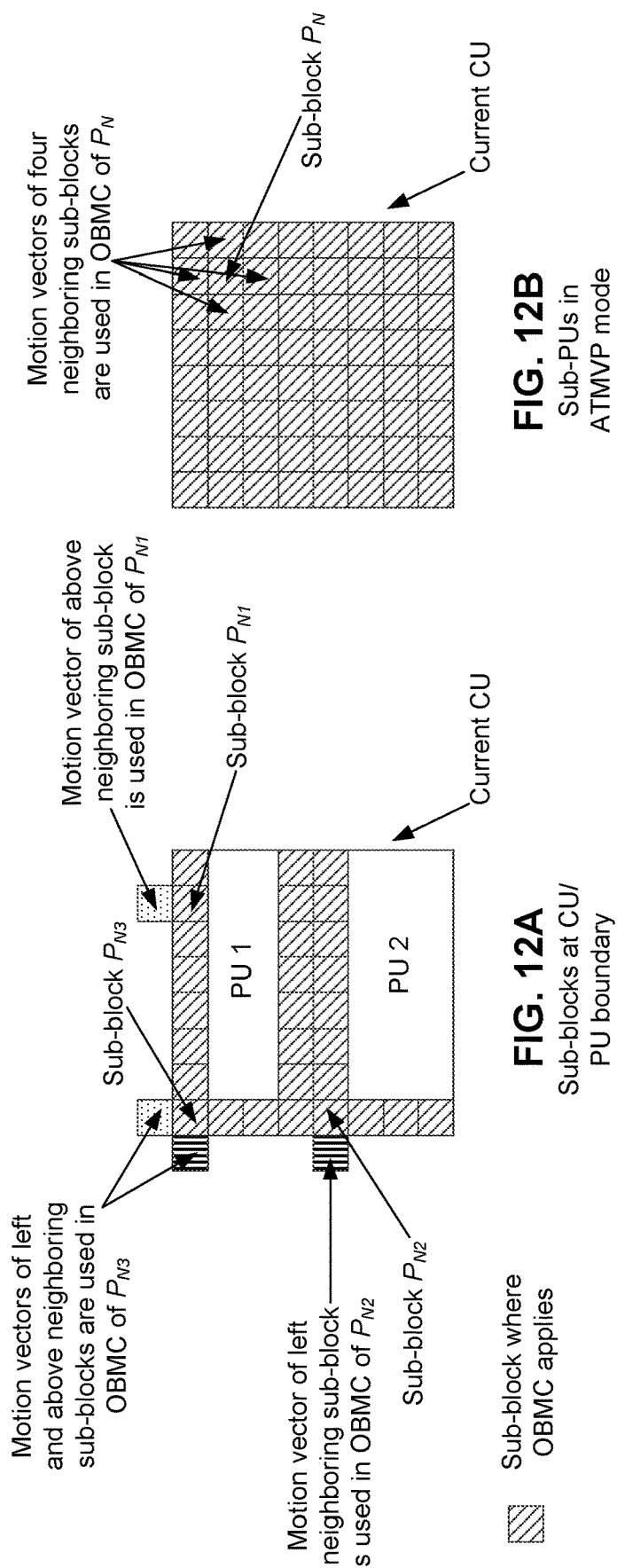
FIGS. 12A and 12B are conceptual diagrams illustrating sub-blocks where OBMC may apply.

FIGS. 12A and 12B are conceptual diagrams illustrating sub-blocks where OBMC may apply. In the Joint Exploration Model (JEM) reference software (available at https://jvet.hhi.fraunhofer.de/), sub-PU level OBMC is applied. The OBMC is performed for all Motion Compensated (MC) block boundaries except the right and bottom boundaries of a CU. Moreover, it is applied for both luma and chroma components. In HEVC, a MC block is corresponding to a PU. In JEM, when a PU is coded with sub-PU mode, each sub-block of the PU is a MC block. To process CU/PU boundaries in a uniform fashion, OBMC is performed at sub-block level for all MC block boundaries, where sub-block size is set equal to 4×4, as illustrated in FIGS. 12A and 12B.

When OBMC applies to the current sub-block, besides current motion vectors, motion vectors of four connected neighbouring sub-blocks are also used to derive prediction block for the current sub-block if they are available and are not identical to the current motion vector. These multiple prediction blocks based on multiple motion vectors are weighted to generate the final prediction signal of the current sub-block.

Prediction blocks based on motion vectors of a neighboring sub-block may be denoted as $P_N$, with N indicating an index for the neighbouring above, below, left and right sub-blocks. Prediction block based on motion vectors of a current block may be denoted as $P_C$. When $P_N$ belongs to the same PU as $P_C$ (thus contains the same motion information), the OBMC is not performed from $P_N$. Otherwise, every pixel of $P_N$ is added to the same pixel in $P_C$, i.e., four rows/columns of $P_N$ are added to $P_C$. The weighting factors {¼, ⅛, 1/16, 1/32} are used for $P_N$ and the weighting factors {¾, ⅞, 15/16, 31/32} are used for $P_C$. The exception are small MC blocks, (i.e., when PU size is equal to 8×4, 4×8 or a PU is coded with ATMVP mode), for which only two rows/columns of $P_N$ are added to $P_C$. In this case weighting factors {¼, ⅛} may be used for $P_N$ and weighting factors {¾, ⅞} are used for $P_C$. For $P_N$ generated based on motion vectors of vertically (horizontally) neighbouring sub-block, pixels in the same row (column) of $P_N$ are added to $P_C$ with a same weighting factor. Note that for PU boundaries, OBMC can be applied on each side of the boundary. Such as in FIGS. 12A and 12B, OBMC can be applied along boundary between PU1 and PU2 twice. First, OBMC is applied with PU2's MV to the shaded blocks along the boundary inside PU1. Second, OBMC is applied with the PU1's MV to the shaded blocks along the boundary inside PU2. In contrast, OBMC can only be applied to one side of CU boundaries because when coding the current CU, we cannot change CUs which have been coded.

Figure 13:
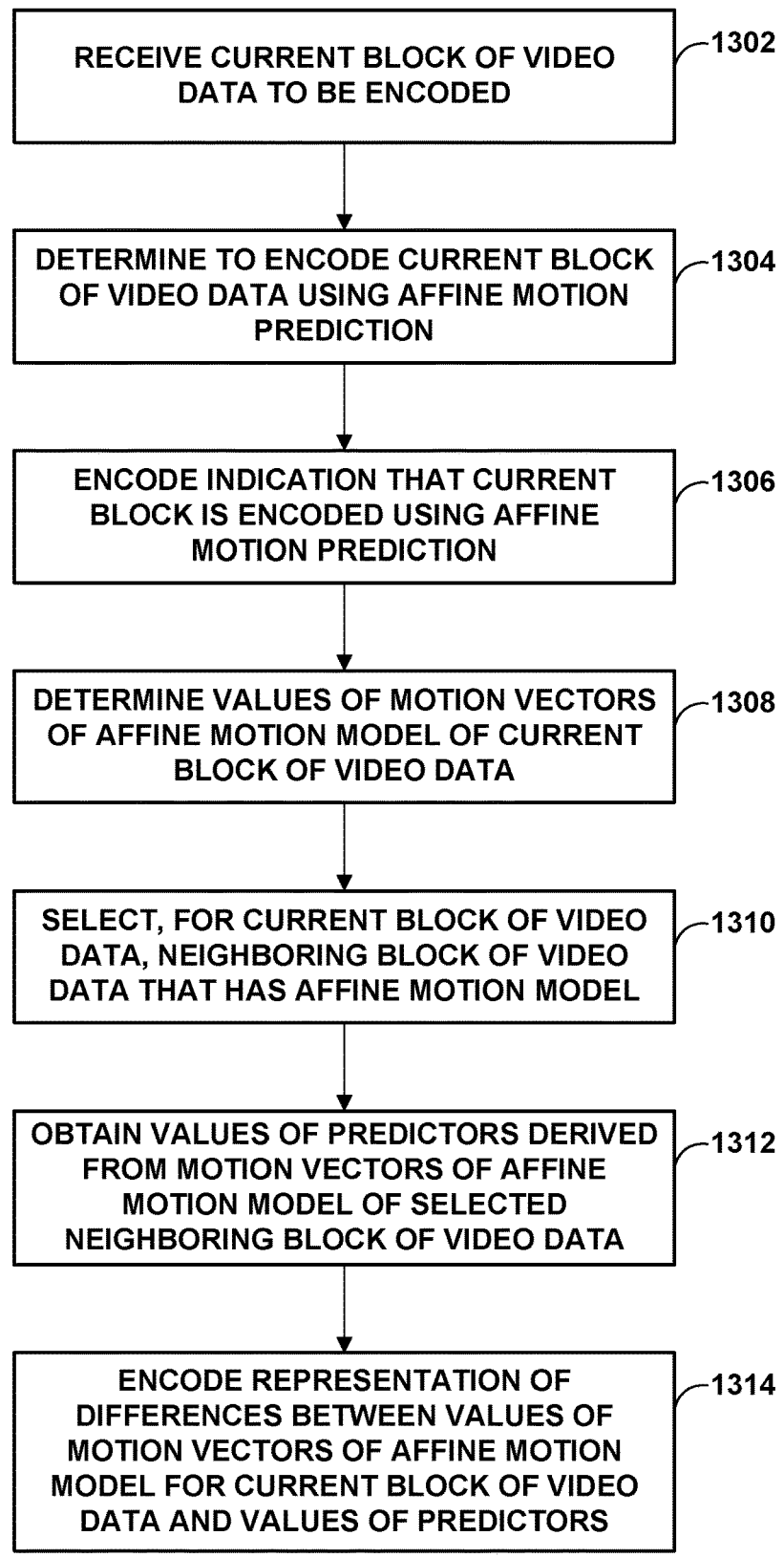
FIG. 13 is a flowchart illustrating an example method for performing affine motion compensation by a video encoder (e.g., during a video encoding process), in accordance with one or more techniques of this disclosure.

FIG. 13 is a flowchart illustrating an example method for performing affine motion compensation by a video encoder (e.g., during a video encoding process), in accordance with one or more techniques of this disclosure. For purposes of example and explanation, the method of FIG. 13 is described with respect to video encoder 20 of FIGS. 1 and 2.

Video encoder 20 may receive a current block of video data to be encoded (1302). For instance, video encoder 20 may receive, from video source 18, raw pixel values (e.g., RGB, CMYK, YUV, etc.) for a current picture of video data that includes the current block of video data. Partition unit 48 of mode select unit 40 of video encoder 20 may divide the current picture up into a plurality of blocks, one of which may be the current block.

Video encoder 20 may determine to encode the current block of video data using affine motion prediction (1304). For instance, mode select unit 40 may determine to encode the current block of video data using inter-prediction mode, and select affine motion model as a motion information prediction mode. Mode select unit 40 may determine to use inter-prediction mode based on a wide variety of factors, such as a frame type of the current picture (e.g., P-frame, an I-frame, a B-frame, etc.), and which prediction mode results in the lowest rate-distortion optimization (RDO) cost.

Video encoder 20 may encode an indication that the current block is encoded using affine motion prediction (1306). For instance, mode select unit 40 may cause entropy encoding unit 56 of video encoder 20 to encode, in a video bitstream, one or more syntax elements that indicate that the current block is encoded using inter-prediction mode, one or more syntax elements that indicate that affine motion model is the motion information prediction mode for the current block, and/or one or more syntax elements that indicate that the current block is encoded using inter-prediction mode and affine motion model is the motion information prediction mode for the current block.

Video encoder 20 may determine values of motion vectors of an affine motion model of the current block of video data (1308). For instance, motion estimation unit 42 and/or motion compensation unit 44 of video encoder 20 may identify a predictor block of video data having pixel values that closely match pixel values of the current block of video data. Motion estimation unit 42 and/or motion compensation unit 44 may determine two or more motion vectors that represent an affine transformation between the current block of video data and the predictor block of video data.

As discussed above, in some examples, motion estimation unit 42 and/or motion compensation unit 44 may always use a four-parameter affine motion model that includes two motion vectors to identify the predictor block. Similarly, in some examples, motion estimation unit 42 and/or motion compensation unit 44 may always use a six-parameter affine motion model that includes three motion vectors to identify the predictor block. In yet other examples, motion estimation unit 42 and/or motion compensation unit 44 may selectively use either a four-parameter affine motion model that includes two motion vectors (e.g., $v_0$ and $v_1$ of FIG. 8, also referred to as MV0 and MV1) or a six-parameter affine motion model that includes three motion vectors (e.g., $v_0$, $v_1$, and $v_2$ of FIG. 8, also referred to as MV0, MV1, and MV2) to identify the predictor block.

In some examples, video encoder 20 may encode an indication of whether the current block is coded using a four-parameter model or a six-parameter model. For instance, motion estimation unit 42 and/or motion compensation unit 44 may cause entropy encoding unit 56 to encode, in an encoded video bitstream, a syntax element that indicates whether the affine motion model for the current block of video data comprises a four-parameter model or a six-parameter model. In some examples, entropy encoding unit 56 may encode the syntax element in one or more of a video parameter set (VPS), sequence parameter set (SPS), picture parameter set (PPS), or a slice header referred to by the current block of video data. In some examples, entropy encoding unit 56 may encode the syntax element at the coding unit (CU) level of a CU that includes the current block of video data Video encoder 20 may select, for the current block of video data, a neighboring block of video data that has an affine motion model (1310). For instance, when encoding current block 800 of FIG. 8, motion estimation unit 42 and/or motion compensation unit 44 may evaluate blocks 802A-802G of FIG. 8 in a particular order and select the first block, in the particular order, that is coded using affine motion compensation (e.g., the first block that has an available affine motion model) as the selected neighboring block of video data. In some examples, the current block of video data may be coded using affine inter mode. In some examples, the selected neighboring block of video data may be coded using affine inter mode (e.g., AF_INTER) or affine merge mode (e.g., AF_MERGE).

Video encoder 20 may obtain values of predictors of motion vectors of the affine motion model of the selected neighboring block of video data (1312). For instance, motion estimation unit 42 and/or motion compensation unit 44 may obtain the values of the affine motion model of the selected neighboring block of video data from a memory or storage device of video encoder 20, such as reference picture memory 64. Motion estimation unit 42 and/or motion compensation unit 44 may warp the values of the affine motion model of the selected neighboring block of video data to the position of the current block to derive the values of the predictors. In other words, motion estimation unit 42 and/or motion compensation unit 44 may extrapolate the values of the predictors from the values of the affine motion model of the selected neighboring block of video data. As one example, where the selected neighboring block is block 802F of FIG. 8, video encoder 20 may obtain values of a plurality of motion vectors of block 802F (e.g., values of the CPMVs of block 802F), and warp the values of the plurality of motion vectors of block 802F to the position of current block 800. As another example, where the selected neighboring block is block 802F of FIG. 8, video encoder 20 may use the values of the plurality of motion vectors of block 802F (e.g., values of the CPMVs of block 802F) as the predictors.

Video encoder 20 may encode, in an encoded video bitstream, a representation of differences between values of motion vectors of an affine motion model for the current block of video data and values of the predictors (1314). For instance, motion estimation unit 42 and/or motion compensation unit 44 may determine, for each respective motion vector of the affine motion model of the current block, a respective motion vector difference (MVD) value that represents the difference between the value of the respective motion vector of the affine motion model of the current block and the value of a corresponding predictor derived from the motion vectors of the affine motion model of the selected neighboring block. As one example, where the values of the motion vectors of the affine motion model of the current block are MV0 and MV1 and the values of the predictors derived from the motion vectors of the affine motion model of the selected neighboring block are MVP0 and MVP1, motion estimation unit 42 and/or motion compensation unit 44 may determine a first MVD value as a difference between MV0 and MVP0, and determine a second MVD value as a difference between MV1 and MVP1.

Motion estimation unit 42 and/or motion compensation unit 44 may cause entropy encoding unit 56 to encode, in the encoded video bitstream, one or more syntax elements that represent the values of the determined MVDs.

In some examples, video encoder 20 may further encode, in the encoded video bitstream, residual data that represents pixel differences between the current block and a predictor block identified by the affine motion model of the current block. Video encoder 20 may implement a decoder loop to reconstruct the pixel values of the current block (e.g., for use when predicting future blocks). For instance, video encoder 20 may identify the predictor block based on the affine motion model for the current block, obtain pixel values of the predictor block from reference picture memory 64, and add the residual values to the pixel values of the predictor block to reconstruct the pixel values of the current block.

Figure 14:
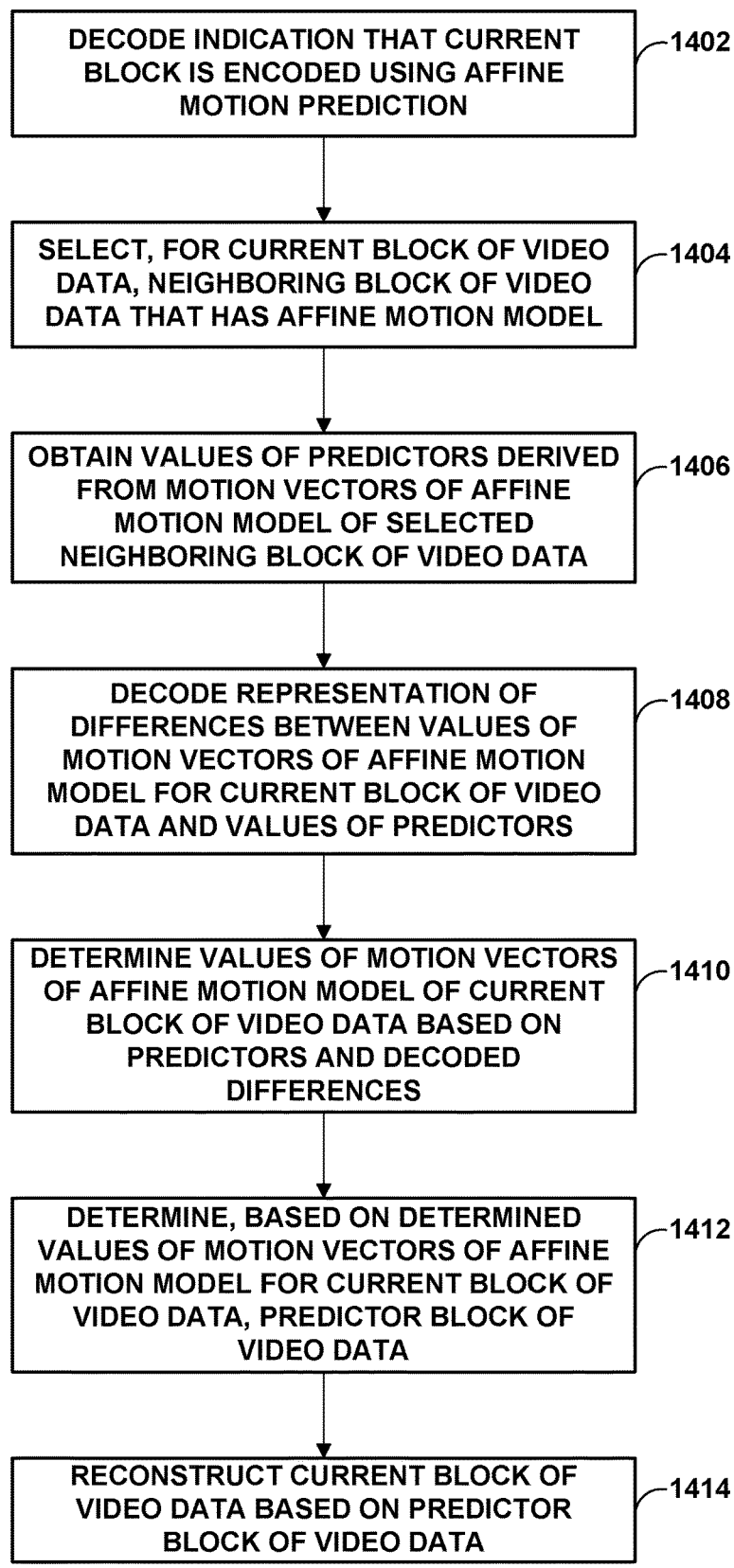
FIG. 14 is a flowchart illustrating an example method for performing affine motion compensation by a video decoder (e.g., during a video decoding process), in accordance with one or more techniques of this disclosure.

FIG. 14 is a flowchart illustrating an example method for performing affine motion compensation by a video decoder (e.g., during a video decoding process), in accordance with one or more techniques of this disclosure. For purposes of example and explanation, the method of FIG. 14 is described with respect to video decoder 30 of FIGS. 1 and 3.

Video decoder 30 may decode an indication that a current block is encoded using affine motion prediction (1402). For instance, entropy decoding unit 70 may decode, from a video bitstream, one or more syntax elements that indicate that the current block is encoded using inter-prediction mode, one or more syntax elements that indicate that affine motion model is the motion information prediction mode for the current block, and/or one or more syntax elements that indicate that the current block is encoded using inter-prediction mode and affine motion model is the motion information prediction mode for the current block. Entropy decoding unit 70 may provide the values of the decoded syntax elements to motion compensation unit 72.

Video decoder 30 may select, for the current block of video data, a neighboring block of video data that has an affine motion model (1404). For instance, when decoding current block 800 of FIG. 8, motion compensation unit 72 may evaluate blocks 802A-802G of FIG. 8 in a particular order and select the first block, in the particular order, that is coded using affine motion compensation (e.g., the first block that has an available affine motion model) as the selected neighboring block of video data. In some examples, the current block of video data may be coded using affine inter mode. In some examples, the selected neighboring block of video data may be coded using affine inter mode (e.g., AF_INTER) or affine merge mode (e.g., AF_MERGE).

Video decoder 30 may obtain values of predictors derived from motion vectors of the affine motion model of the selected neighboring block of video data (1406). For instance, motion compensation unit 72 may obtain the values of the affine motion model of the selected neighboring block of video data from a memory or storage device of video decoder 30, such as reference picture memory 82. Motion compensation unit 72 may warp the values of the affine motion model of the selected neighboring block of video data to the position of the current block to derive the values of the predictors. In other words, motion compensation unit 72 may extrapolate the values of the predictors from the values of the affine motion model of the selected neighboring block of video data. As one example, where the selected neighboring block is block 802F of FIG. 8, video decoder 30 may obtain values of a plurality of motion vectors of block 802F (e.g., values of the CPMVs of block 802F), and warp the values of the plurality of motion vectors of block 802F to the position of current block 800. As another example, where the selected neighboring block is block 802F of FIG. 8, video decoder 30 may use the values of the plurality of motion vectors of block 802F (e.g., values of the CPMVs of block 802F) as the predictors.

Video decoder 30 may decode, from an encoded video bitstream, a representation of differences between values of motion vectors of an affine motion model for the current block of video data and the values of the predictors (1408). For instance, entropy decoding unit 70 may decode, from the encoded video bitstream, syntax elements that represent values of differences between the value of the respective motion vector of the affine motion model of the current block and the value of a corresponding predictor derived from the motion vectors of the affine motion model of the selected neighboring block. As one example, where the values of the motion vectors of the affine motion model of the current block are MV0 and MV1 and the values of the predictors derived from the motion vectors of the affine motion model of the selected neighboring block are MVP0 and MVP1, entropy decoding unit 70 may decode syntax elements that represent the value of a first MVD value and a second MVD value, the first MVD value being a difference between MV0 and MVP0 and the second MVD value being a difference between MV1 and MVP1. Entropy decoding unit 70 may provide the values of the decoded syntax elements to motion compensation unit 72.

Video decoder 30 may determine the values of the motion vectors of the affine motion model for the current block of video data based on the values of the predictors and the decoded differences (1410). For instance, motion compensation unit 72 may add the value of MVP0 to the value of the first MVD value to determine the value of MV0 and add the value of MVP1 to the value of the second MVD value to determine the value of MV1.

Video decoder 30 may determine, based on the determine values of the motion vectors of the affine motion model for the current block of video data, a predictor block of video data (1412). For instance, motion compensation unit 72 may obtain, from reference picture memory 82, pixel values of the predictor block identified by the affine motion model for the current block of video data.

Video decoder 30 may reconstruct the current block of video data based on the predictor block of video data (1414). For instance, entropy decoding unit 70 may decode, from the encoded video bitstream, residual data that represents pixel differences between the current block and a predictor block identified by the affine motion model of the current block. Motion compensation unit 72 may add the residual values to the pixel values of the predictor block to reconstruct the pixel values of the current block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
   obtaining, by one or more processors of a video decoder and for a current block of a current picture of video data, values of motion vectors of an affine motion model of a neighboring block of video data;
   decoding, by the one or more processors and from an encoded video bitstream, a first syntax element included in a sequence parameter set (SPS) referred to by the current picture, wherein a first value of the first syntax element indicates that motion compensation for pictures referring to the SPS can be performed using a four-parameter affine motion model defined by two motion vectors, and wherein a second value of the first syntax element indicates that motion compensation for pictures referring to the SPS can be performed using either a four-parameter affine motion model defined by two motion vectors or a six-parameter affine motion model defined by three motion vectors;
   responsive to the first syntax element having the second value:
      decoding, by the one or more processors and from the encoded video bitstream, a second syntax element, wherein a first value of the second syntax element indicates that motion compensation for the current block is to be performed using a four-parameter affine motion model defined by two motion vectors, and wherein a second value of the second syntax element indicates that motion compensation for the current block is to be performed using a six-parameter affine motion model defined by three motion vectors; and
      deriving, by the one or more processors and from the values of the motion vectors of the affine motion model of the neighboring block of video data, values of predictors for motion vectors of the affine motion model of the current block of video data indicated by the second syntax element;
   decoding, by the one or more processors and from the encoded video bitstream, a representation of differences between the values of the motion vectors of the affine motion model for the current block of video data and the values of the predictors;
   determining, by the one or more processors, the values of the motion vectors of the affine motion model for the current block of video data from the values of the predictors and the decoded differences;
   determining, based on the determined values of the motion vectors of the affine motion model for the current block of video data, a predictor block of video data; and
   reconstructing the current block of video data based on the predictor block of video data.

2. The method of claim 1, wherein the current block of video data is decoded using affine inter mode.

3. The method of claim 2, wherein the neighboring block of video data is decoded using affine inter mode or affine merge mode.

4. The method of claim 1, wherein the neighboring block of video comprises a selected neighboring block of video data, and wherein obtaining the values of the motion vectors of the affine motion model of the selected neighboring block of video data comprises:
   evaluating, in a pre-defined order, neighboring blocks of video data of the current block of video data; and
   selecting a first neighboring block of video data of the plurality of neighboring blocks of video data decoded using affine motion compensation as the selected neighboring block of video data.

5. The method of claim 1, wherein decoding the second syntax element comprises decoding the second syntax element from a coding unit (CU) that includes the current block of video data.

6. The method of claim 1, the method being executable on a wireless communication device, wherein the device comprises: a memory; the one or more processors; and a receiver, the method further comprising:
storing, by the memory, the video data; and
receiving, by the receiver, the encoded video bitstream.

7. A method for encoding video data, the method comprising:
determining, by one or more processors of a video encoder, whether motion compensation for a current block of a current picture of video data is to be performed using a four-parameter affine model defined by two motion vectors or a six-parameter affine model defined by three motion vectors;
determining, by the one or more processors, values of motion vectors of the affine motion model of the current block of video data, the motion vectors of the affine motion model identifying a predictor block of video data for of the current block of video data;
obtaining, by the one or more processors, values of motion vectors of an affine motion model of a neighboring block of video data;
deriving, by the one or more processors and from the values of the motion vectors of the affine motion model of the neighboring block of video data, values of predictors for motion vectors of an affine motion model of the current block of video data;
encoding, by the one or more processors and in an encoded video bitstream, a representation of differences between the values of the motion vectors of the affine motion model for the current block of video data and the values of the predictors;
encoding, by the one or more processors and in the encoded video bitstream, a first syntax element included in a sequence parameter set (SPS) referred to by the current picture, wherein a first value of the first syntax element indicates that motion compensation for pictures referring to the SPS can be performed using a four-parameter affine motion model defined by two motion vectors, and wherein a second value of the first syntax element indicates that motion compensation for pictures referring to the SPS can be performed using either a four-parameter affine motion model defined by two motion vectors or a six-parameter affine motion model defined by three motion vectors; and
when the first syntax element has the second value, encoding, by the one or more processors and in the encoded video bitstream, a second syntax element, wherein a first value of the second syntax element indicates that motion compensation for the current block is to be performed using a four-parameter affine motion model defined by two motion vectors, and wherein a second value of the second syntax element indicates that motion compensation for the current block is to be performed using a six-parameter affine motion model defined by three motion vectors.

8. The method of claim 7, wherein the current block of video data is encoded using affine inter mode.

9. The method of claim 8, wherein the neighboring block of video data is encoded using affine inter mode or affine merge mode.

10. The method of claim 7, wherein the neighboring block of video comprises a selected neighboring block of video data, and wherein obtaining the values of the motion vectors of the affine motion model of the selected neighboring block of video data comprises:
evaluating, in a pre-defined order, neighboring blocks of video data of the current block of video data; and
selecting a first neighboring block of video data of the plurality of neighboring blocks of video data decoded using affine motion compensation as the selected neighboring block of video data.

11. The method of claim 7, wherein encoding the second syntax element comprises encoding the second syntax element in a coding unit (CU) that includes the current block of video data.

12. The method of claim 7, the method being executable on a wireless communication device, wherein the device comprises: a memory; the one or more processors; and a transmitter, the method further comprising:
storing, by the memory, the video data; and
transmitting, by the transmitter, the encoded video bitstream.

13. The method of claim 12, wherein the wireless communication device is a cellular telephone, the method further comprising:
modulating the encoded video bitstream according to a cellular communication standard.

14. A device for decoding a block of video data, the device comprising:
a memory configured to store the video data; and
one or more processing units implemented in circuitry and configured to:
obtain, for a current block of a current picture of video data, values of motion vectors of an affine motion model of a neighboring block of video data;
decode, from an encoded video bitstream, a first syntax element included in a sequence parameter set (SPS) referred to by the current picture, wherein a first value of the first syntax element indicates that motion compensation for pictures referring to the SPS can be performed using a four-parameter affine motion model defined by two motion vectors, and wherein a second value of the first syntax element indicates that motion compensation for pictures referring to the SPS can be performed using either a four-parameter affine motion model defined by two motion vectors or a six-parameter affine motion model defined by three motion vectors;
responsive to the first syntax element having the second value:
decode, by the one or more processors and from the encoded video bitstream, a second syntax element, wherein a first value of the second syntax element indicates that motion compensation for the current block is to be performed using a four-parameter affine motion model defined by two motion vectors, and wherein a second value of the second syntax element indicates that motion compensation for the current block is to be performed using a six-parameter affine motion model defined by three motion vectors; and
derive, from the values of the motion vectors of the affine motion model of the neighboring block of video data, values of predictors for motion vectors of the affine motion model of the current block of video data indicated by the second syntax element;

decode, from the encoded video bitstream, a representation of differences between the values of the motion vectors of the affine motion model for the current block of video data and the values of the predictors;

determine the values of the motion vectors of the affine motion model for the current block of video data from the values of the predictors and the decoded differences;

determine based on the determined values of the motion vectors of the affine motion model for the current block of video data, a predictor block of video data; and reconstruct the current block of video data based on the predictor block of video data.

15. The device of claim 14, wherein the current block of video data is decoded using affine inter mode.

16. The device of claim 15, wherein the neighboring block of video data is decoded using affine inter mode or affine merge mode.

17. The device of claim 14, wherein the neighboring block of video comprises a selected neighboring block of video data, and wherein, to obtain the values of the motion vectors of the affine motion model of the selected neighboring block of video data, the one or more processing units are configured to:

evaluate, in a pre-defined order, neighboring blocks of video data of the current block of video data; and select a first neighboring block of video data of the plurality of neighboring blocks of video data decoded using affine motion compensation as the selected neighboring block of video data.

18. The device of claim 14, wherein, to decode the second syntax element, the one or more processing units are configured to decode the second syntax element from a coding unit (CU) that includes the current block of video data.

19. The device of claim 14, further comprising at least one of:

a display configured to display the reconstructed video data; or a camera configured to capture the video data.

20. The device of claim 14, wherein the device comprises one or more of a camera, a computer, a mobile device, a broadcast receiver device, or a set-top box.

21. A device for encoding a block of video data, the device comprising:

a memory configured to store the video data; and one or more processing units implemented in circuitry and configured to:

determine whether motion compensation for a current block of a current picture of video data is to be performed using a four-parameter affine model defined by two motion vectors or a six-parameter affine model defined by three motion vectors;

determine values of motion vectors of the affine motion model of the current block of video data, the motion vectors of the affine motion model identifying a predictor block of video data for of the current block of video data;

obtain values of motion vectors of an affine motion model of a neighboring block of video data;

derive, from the values of the motion vectors of the affine motion model of the neighboring block of video data, values of predictors for motion vectors of an affine motion model of the current block of video data; and encode, in an encoded video bitstream, a representation of differences between the values of the motion vectors of the affine motion model for the current block of video data and the values of the predictors;

encode, in the encoded video bitstream, a first syntax element included in a sequence parameter set (SPS) referred to by the current picture, wherein a first value of the first syntax element indicates that motion compensation for pictures referring to the SPS can be performed using a four-parameter affine motion model defined by two motion vectors, and wherein a second value of the first syntax element indicates that motion compensation for pictures referring to the SPS can be performed using either a four-parameter affine motion model defined by two motion vectors or a six-parameter affine motion model defined by three motion vectors; and where the first syntax element has the second value, encode, in the encoded video bitstream, a second syntax element, wherein a first value of the second syntax element indicates that motion compensation for the current block is to be performed using the four-parameter affine motion model defined by two motion vectors, and wherein a second value of the second syntax element indicates that motion compensation for the current block is to be performed using the six-parameter affine motion model defined by three motion vectors.

22. The device of claim 21, wherein the current block of video data is encoded using affine inter mode.

23. The device of claim 22, wherein the neighboring block of video data is encoded using affine inter mode or affine merge mode.

24. The device of claim 21, wherein the neighboring block of video comprises a selected neighboring block of video data, and wherein, to obtain the values of the motion vectors of the affine motion model of the selected neighboring block of video data, the one or more processing units are configured to:

evaluate, in a pre-defined order, neighboring blocks of video data of the current block of video data; and select a first neighboring block of video data of the plurality of neighboring blocks of video data decoded using affine motion compensation as the selected neighboring block of video data.

25. The device of claim 21, wherein, to encode the second syntax element, the one or more processing units are configured to encode the second syntax element in a coding unit (CU) that includes the current block of video data.

26. The device of claim 21, further comprising at least one of:

a display configured to display the reconstructed video data; or a camera configured to capture the video data.

27. The device of claim 21, wherein the device comprises one or more of a camera, a computer, a mobile device, a broadcast receiver device, or a set-top box.

28. A video decoder device comprising:

means for obtaining, for a current block of a current picture of video data, values of motion vectors of an affine motion model of a neighboring block of video data;

means for decoding, from an encoded video bitstream, a first syntax element included in a sequence parameter set (SPS) referred to by the current picture, wherein a first value of the first syntax element indicates that motion compensation for pictures referring to the SPS can be performed using a four-parameter affine motion model defined by two motion vectors, and wherein a second value of the first syntax element indicates that motion compensation for pictures referring to the SPS can be performed using either a four-parameter affine motion model defined by two motion vectors or a six-parameter affine motion model defined by three motion vectors;

means for decoding, from the encoded video bitstream and responsive to the first syntax element having the second value, a second syntax element, wherein a first value of the second syntax element indicates that motion compensation for the current block is to be performed using a four-parameter affine motion model defined by two motion vectors, and wherein a second value of the second syntax element indicates that motion compensation for the current block is to be performed using a six-parameter affine motion model defined by three motion vectors;

means for deriving, from the values of the motion vectors of the affine motion model of the neighboring block of video data and responsive to the first syntax element having the second value, values of predictors for motion vectors of the affine motion model of the current block of video data indicated by the second syntax element;

means for obtaining differences between the values of the motion vectors of the affine motion model for the current block of video data and the values of the predictors;

means for determining each of the values of the motion vectors of the affine motion model for the current block of video data from the values of the predictors and the decoded differences; and means for identifying, based on the determined values of the motion vectors of the affine motion model for the current block of video data, a predictor block of video data.

29. A non-transitory computer-readable storage medium storing instructions that, when executed, cause one or more processors of a video decoder to:

obtain, for a current block of a current picture of video data, values of motion vectors of an affine motion model of a neighboring block of video data;

decode, from an encoded video bitstream, a first syntax element included in a sequence parameter set (SPS) referred to by the current picture, wherein a first value of the first syntax element indicates that motion compensation for pictures referring to the SPS can be performed using a four-parameter affine motion model defined by two motion vectors, and wherein a second value of the first syntax element indicates that motion compensation for pictures referring to the SPS can be performed using either a four-parameter affine motion model defined by two motion vectors or a six-parameter affine motion model defined by three motion vectors;

responsive to the first syntax element having the second value:

decode a syntax element, wherein a first value of the syntax element indicates that motion compensation for the current block is to be performed using a four-parameter affine motion model defined by two motion vectors, and wherein a second value of the syntax element indicates that motion compensation for the current block is to be performed using a six-parameter affine motion model defined by three motion vectors; and derive, from the values of the motion vectors of the affine motion model of the neighboring block of video data, values of predictors for motion vectors of the affine motion model of the current block of video data indicated by the second syntax element;

obtain differences between the values of the motion vectors of the affine motion model for the current block of video data and the values of the predictors;

determine each of the values of the motion vectors of the affine motion model for the current block of video data from the values of the predictors and the decoded differences; and identify, based on the determined values of the motion vectors of the affine motion model for the current block of video data, a predictor block of video data.

30. The method of claim 1, wherein the syntax element is a flag that is coded with either the first value or the second value.

31. The method of claim 7, wherein the syntax element is a flag that is coded with either the first value or the second value.

32. The device of claim 14, wherein the syntax element is a flag that is coded with either the first value or the second value.

33. The device of claim 21, wherein the syntax element is a flag that is coded with either the first value or the second value.

34. The method of claim 1, further comprising, responsive to the first syntax element having the first value:

not decoding the second syntax element; and deriving, by the one or more processors and from the values of the motion vectors of the affine motion model of the neighboring block of video data, values of predictors for motion vectors of a four-parameter affine motion model for the current block of video data.

35. The method of claim 7, further comprising not encoding the second syntax element where the first syntax element has the first value.

36. The device of claim 14, wherein, responsive to the first syntax element having the first value, the one or more processing units are configured to:

not decode the second syntax element; and derive, from the values of the motion vectors of the affine motion model of the neighboring block of video data, values of predictors for motion vectors of a four-parameter affine motion model for the current block of video data.

37. The device of claim 21, wherein, where the first syntax element has the first value, the one or more processing units are configured to not encode the second syntax element.

* * * * *